(12) United States Patent
Toh et al.

(10) Patent No.: US 6,988,199 B2
(45) Date of Patent: Jan. 17, 2006

(54) SECURE AND RELIABLE DOCUMENT DELIVERY

(75) Inventors: Eng-Whatt Toh, Singapore (SG);
Chee-Hong Wong, Singapore (SG);
Kok-Hoon Teo, Singapore (SG);
See-Wai Yip, Singapore (SG)

(73) Assignee: Message Secure, Lowell, MA (US)

( * ) Notice: Subject to any disclaimer, the term of this patent is extended or adjusted under 35 U.S.C. 154(b) by 737 days.

(21) Appl. No.: 09/887,157

(22) Filed: Jun. 21, 2001

(65) Prior Publication Data

US 2002/0004902 A1  Jan. 10, 2002

Related U.S. Application Data

(60) Provisional application No. 60/216,734, filed on Jul. 7, 2000, provisional application No. 60/242,015, filed on Oct. 19, 2000, provisional application No. 60/242,014, filed on Oct. 19, 2000.

(51) Int. Cl.
*H04L 9/00* (2006.01)

(52) U.S. Cl. ...................................................... 713/170
(58) Field of Classification Search ................ 713/165, 713/176, 170; 705/60
See application file for complete search history.

(56) References Cited

U.S. PATENT DOCUMENTS

| | | | |
|---|---|---|---|
| 4,625,076 A | 11/1986 | Okamoto et al. ......... | 178/22.11 |
| 4,713,780 A | 12/1987 | Schultz et al. ............... | 364/514 |
| 4,754,428 A | 6/1988 | Schultz et al. ............... | 364/900 |
| 4,816,655 A | 3/1989 | Musyck et al. ............. | 235/380 |
| 4,868,877 A | 9/1989 | Fischer ......................... | 380/25 |
| 5,005,200 A | 4/1991 | Fischer ......................... | 380/30 |
| 5,018,196 A | 5/1991 | Takaragi et al. .............. | 380/30 |
| 5,138,653 A | 8/1992 | Le Clercq .................... | 379/96 |
| 5,157,726 A | 10/1992 | Merkle et al. ................ | 380/23 |
| 5,210,869 A | 5/1993 | Williams ..................... | 395/600 |
| 5,241,599 A | 8/1993 | Bellovin et al. .............. | 380/21 |
| 5,261,002 A * | 11/1993 | Perlman et al. ............... | 380/30 |
| 5,283,887 A | 2/1994 | Zachery ...................... | 395/500 |
| 5,293,250 A | 3/1994 | Okumura et al. ........... | 358/402 |
| 5,315,635 A | 5/1994 | Kane et al. ................... | 379/57 |
| 5,388,158 A | 2/1995 | Berson ........................ | 380/23 |
| 5,396,537 A | 3/1995 | Schwendeman ............. | 379/57 |
| 5,398,285 A | 3/1995 | Borgelt et al. ................ | 380/30 |
| 5,424,724 A | 6/1995 | Williams et al. ....... | 340/825.05 |

(Continued)

FOREIGN PATENT DOCUMENTS

EP          869652 A2     4/1998

(Continued)

OTHER PUBLICATIONS

Ellison, C. et al. Ten Risks of PKI: What You're not Being Told about Public Key Infrastructure. Computer Security Journal, vol. XVI, No. 1 (2000), pp. 1-7.

(Continued)

*Primary Examiner*—Gregory Morse
*Assistant Examiner*—Thomas Ho
(74) *Attorney, Agent, or Firm*—Merek, Blackmon & Vorhees, LLC

(57) ABSTRACT

An Operations Center (OC) (200) acts as a central key manager and intermediary in securely, reliably and non-repudiably delivering a document (3) from a sender (100) to a recipient (300). The OC (200) acts as a key manager to facilitate the process of strong authentication of the sender (100) and the recipient (300), encryption of the delivery (510), and setup of reliable connections (2A, 2B, 2C). In a preferred embodiment, the reliable connections (2A, 2B, 2C) are virtual private network connections.

67 Claims, 9 Drawing Sheets

U.S. PATENT DOCUMENTS

| | | | | |
|---|---|---|---|---|
| 5,432,785 | A | 7/1995 | Ahmed et al. | 370/60.1 |
| 5,432,852 | A | 7/1995 | Leighton et al. | 380/30 |
| 5,436,972 | A | 7/1995 | Fischer | 380/25 |
| 5,544,152 | A | 8/1996 | Obermanns et al. | 370/16 |
| 5,557,346 | A | 9/1996 | Lipner et al. | 380/21 |
| 5,557,765 | A | 9/1996 | Lipner et al. | 380/21 |
| 5,581,615 | A | 12/1996 | Stern | 380/25 |
| 5,623,653 | A | 4/1997 | Matsuno et al. | 395/609 |
| 5,633,929 | A | 5/1997 | Kaliski, Jr. | 380/23 |
| 5,638,446 | A | 6/1997 | Rubin | 380/25 |
| 5,642,420 | A | 6/1997 | Kuroda et al. | |
| 5,671,285 | A | 9/1997 | Newman | 380/30 |
| 5,689,565 | A | 11/1997 | Spies et al. | 380/25 |
| 5,689,567 | A | 11/1997 | Miyauchi | 380/25 |
| 5,706,452 | A | 1/1998 | Ivanov | 395/331 |
| 5,721,777 | A | 2/1998 | Blaze | 380/4 |
| 5,734,651 | A | 3/1998 | Blakeley et al. | 370/392 |
| 5,745,573 | A | 4/1998 | Lipner et al. | 380/21 |
| 5,751,813 | A | 5/1998 | Dorenbos | 380/49 |
| 5,751,814 | A | 5/1998 | Kafri | 380/49 |
| 5,764,918 | A | 6/1998 | Poulter | 395/200.66 |
| 5,767,847 | A | 6/1998 | Mori et al. | 345/329 |
| 5,768,271 | A | 6/1998 | Seid et al. | 370/389 |
| 5,790,790 | A | 8/1998 | Smith et al. | 395/200.36 |
| 5,799,086 | A | 8/1998 | Sudia | 380/23 |
| 5,802,286 | A | 9/1998 | Dere et al. | 395/200.5 |
| 5,812,669 | A | 9/1998 | Jenkins et al. | 380/25 |
| 5,812,671 | A | 9/1998 | Ross, Jr. | |
| 5,825,865 | A | 10/1998 | Oberlander et al. | 395/600 |
| 5,832,218 | A | 11/1998 | Gibbs et al. | 395/200.33 |
| 5,841,865 | A | 11/1998 | Sudia | 380/21 |
| 5,845,074 | A | 12/1998 | Kobata | 395/200.49 |
| 5,848,248 | A | 12/1998 | Kawasaki et al. | 395/200.68 |
| 5,850,451 | A | 12/1998 | Sudia | 380/49 |
| 5,850,519 | A | 12/1998 | Vazana | 395/200.36 |
| 5,864,667 | A | 1/1999 | Barkan | 395/187.01 |
| 5,872,848 | A | 2/1999 | Romney et al. | 380/25 |
| 5,878,398 | A | 3/1999 | Tokuda et al. | 705/8 |
| 5,898,156 | A | 4/1999 | Wilfong | 235/380 |
| 5,912,974 | A | 6/1999 | Holloway et al. | 380/51 |
| 5,915,024 | A | 6/1999 | Kitaori et al. | 380/25 |
| 5,948,103 | A | 9/1999 | Fukuzaki | 713/200 |
| 5,956,406 | A | 9/1999 | Maldy | 380/30 |
| 5,982,506 | A | * 11/1999 | Kara | 358/405 |
| 6,009,173 | A | 12/1999 | Sumner | 380/21 |
| 6,035,104 | A | 3/2000 | Zahariev | |
| 6,038,541 | A | 3/2000 | Tokuda et al. | 705/8 |
| 6,044,462 | A | * 3/2000 | Zubeldia et al. | 713/158 |
| 6,055,575 | A | 4/2000 | Paulsen et al. | 709/229 |
| 6,061,448 | A | 5/2000 | Smith et al. | 380/21 |
| 6,064,878 | A | 5/2000 | Denker et al. | |
| 6,079,020 | A | 6/2000 | Liu | 713/201 |
| 6,081,610 | A | 6/2000 | Dwork et al. | 382/119 |
| 6,085,322 | A | 7/2000 | Romney et al. | 713/176 |
| 6,092,113 | A | 7/2000 | Maeshima et al. | 709/230 |
| 6,092,200 | A | 7/2000 | Muniyappa et al. | 713/201 |
| 6,119,137 | A | 9/2000 | Smith et al. | 707/523 |
| 6,173,399 | B1 | 1/2001 | Gilbrech | 713/153 |
| 6,226,748 | B1 | 5/2001 | Bots et al. | 713/201 |

FOREIGN PATENT DOCUMENTS

| | | |
|---|---|---|
| EP | 0840478 A2 | 5/1998 |
| EP | 0915436 A1 | 5/1998 |
| WO | WO 97 41661 A2 | 11/1997 |
| WO | WO 97 41661 A3 | 11/1997 |
| WO | WO 98/57464 | 12/1998 |
| WO | WO 98/57465 | 12/1998 |
| WO | WO 98 58332 A1 | 12/1998 |
| WO | WO99/00958 | 1/1999 |

OTHER PUBLICATIONS

Introduction to SSL [online]. Netscape Communications Corporation (Last updated Oct. 9, 1998) [retrieved on Oct. 24, 2000]. Retrieved from the Internet <URL: http://developer.netscape.com/docs/manuals/security/sslin/contents.htm. pp. 1-11.

Introduction to Public-Key Cryptography [online]. Netscape Communications Corporation [retrieved on Oct. 24, 2000]. Retrieved from the Internet <URL: http://developer.netscape.com/docs/manuals/security/pkin/contents.htm. pp. 1-19.

Lowry, John, "Location-Independent Information Object Security", Proceedings of the Symposium on Network and Distributed System Security, 1995 IEEE, pp. 54-62, XP-002155116.

"What's a VPN Anyway? A Virtual Private Networking Primer", VPNet Technologies, pp. 1-17.

Herfert, M., "Security-Enhanced Mailing Lists" *IEEE Network*, IEEE Inc., New York, US, vol. 11, No. 3, May 1, 1997, pp. 30-33.

* cited by examiner

SECURE AND RELIABLE DOCUMENT DELIVERY

RELATED APPLICATIONS

This application claims the priority benefit of commonly-assigned U.S. Provisional Patent Application Ser. No. 60/216,734, "A VPN-Based Digital Delivery System," by Eng-Whatt Toh, filed 7 Jul. 2000; U.S. Provisional Patent Application Ser. No. 60/242,015, "Application VPN with Application Proxies," by Eng-Whatt Toh, filed 19 Oct. 2000; and U.S. Provisional Application Ser. No. 60/242,014, "Method For Fast Escrow Delivery," by Chee-Hong Wong, Kok-Hoon Teo, See-Wai Yip, and Eng-Whatt Toh, filed 19 Oct. 2000. The subject matter of all of the foregoing is incorporated herein by reference in its entirety.

BACKGROUND OF THE INVENTION

1. Technical Field

This invention relates generally to secure and reliable transmission of data. More particularly, the invention relates to computer-implemented techniques for securely and reliably transmitting an electronic document from a sender to a recipient using a secure, central key managing intermediary.

2. Background Art

With the advent of computers and the Internet, an increasing number of documents are being transmitted in electronic format, and it is becoming increasingly important to be able to deliver these documents in a secure and reliable manner. While unsecured email is perhaps one of the most common electronic delivery methods, it typically is neither secure nor particularly reliable. Other approaches to electronic delivery exist which are more successful in attempting to provide either secure or reliable delivery of documents. Two of the more common approaches are secure electronic mail (a.k.a., secure email) and Secure Socket Layer ("SSL") based deliveries using a Web site for uploading and downloading of deliveries. However, neither of these delivery methods is fully satisfactory with respect to both security and reliability.

Secure email is similar to unsecured email, except that email messages are secured using encryption. In unsecured email, the sender transmits his message to the recipient in an unencrypted state. Thus, if a third party intercepts the message en route to the recipient, the third party will be able to read the message. In secure email, the sender first encrypts the message using a key and then transmits the encrypted message to the recipient. If a third party intercepts this message, it will be unintelligible to the third party since he presumably does not have enough information to decrypt the message (e.g., the third party normally does not have the correct key required to decrypt the message). The recipient, on the other hand, does have the information required to decrypt the message and therefore can read the message when he receives it. By limiting access to the decryption method and keys, the sender can limit who is able to read an encrypted message. By encrypting the message before transmitting, the message is protected during transmission.

However, secure email is delivered from the sender to the recipient using the same architecture and infrastructure as unsecured email and, therefore, suffers from many of the same drawbacks as unsecured email. For example, email delivery services generally lack reliability due to the architecture of the email delivery system. Conventional email servers are designed upon a store-and-forward architecture. An email message may be routed through several email servers on its way from the sender to the recipient, with each server receiving the incoming message, determining the next server on the message's journey, transmitting the message, and possibly leaving behind a copy causing unnecessary and unmanageable audit trails. No single machine is responsible for ensuring that the entire message has been successfully transmitted from the sender to the recipient. In addition, each of the email servers in the chain from sender to recipient is usually owned and operated by a different party. Since no single company or entity owns the entire delivery chain for the email message, no one company or entity can guarantee reliable delivery or integrity of the message. The storing-and-forwarding of email documents through several servers owned by multiple parties means that email messages get lost, delayed, and corrupted. This makes the overall delivery service unreliable or untrackable. Encrypting an email message may provide some protection against unwanted disclosure during transit, but it does not address the reliability issue and does not guarantee that the message will be delivered to the recipient.

An alternate approach to document delivery services utilizes the Secure Socket Layer Protocol for security. In this approach, a Web site uses its digital certificate to authenticate itself to the sender using the SSL protocol. Once the Web site is authenticated, a secure channel is set up between the sender's browser and the Web site, typically by generating a session key to encrypt transmissions between the two. The document is sent from the sender's browser to the Web site via the secure channel. It is stored at the Web site, typically in unencrypted form, awaiting delivery to the recipient. During delivery, the Web site authenticates itself to the recipient's browser and a secure communications channel is then set up between the Web site and the recipient's browser. The document is delivered to the recipient via the secure channel.

The SSL approach suffers from many drawbacks. For example, although the Web site authenticates itself using its digital certificate, neither the sender nor the recipient authenticates himself using a digital certificate. Typically, these systems would at most require the sender and the recipient to authenticate themselves using passwords, which is weak security. In other words, there is no real assurance that either the sender or the recipient actually is who he claims to be. As a result, there is also a lack of non-repudiation, meaning that at a later time, the sender can plausibly deny having sent the document simply by pointing out that there is no strong evidence of who actually sent the document.

Another drawback is that these systems lack end-to-end security, because SSL secures only the channels. The document typically remains in unencrypted form while it is temporarily stored at the Web site. Hence, a third party which attacks the Web site and gains access to the document will be able to read the document. In addition, if the Web site is untrustworthy (or happens to hire an untrustworthy employee), the document will be vulnerable.

There are also SSL-based services that provide optional password encryption of the documents. These systems provide better security, since the document is encrypted at the point of transmission. However, these systems are difficult to use since they require the sender to communicate the password out-of-band to the recipient, a process that is cumbersome and fraught with security risks. Such a system also does not guarantee non-repudiation, since it neither strongly authenticates a user, nor supports digital signatures, nor ensures that only the recipient could open a delivery.

There are also SSL-based services that provide optional encryption of the documents using certificates. These systems provide end-to-end content security, but are extremely difficult to use because of the need for users to manually obtain the keys and exchange keys prior to encryption. Unfortunately, these systems do not integrate key management with encryption and reliable delivery, leaving the complexity of key management entirely to the user. In addition, a system that requires optional use of certificates cannot guarantee non-repudiation. The absence of a digital signature does not represent the absence of a transaction, because the sender could have opted to not use a certificate. Absolute non-repudiation requires mandatory and uniform use of certificates for all transactions in a system.

Both secure email delivery services and SSL-based delivery services suffer from security and/or reliability concerns. Systems that provide SSL with optional document encryption are difficult to use and are non-transparent. Therefore, there is a need for a delivery system which provides integrated key management so that reliable delivery and end-to-end security can be achieved, thus providing some or all of the following benefits: (1) reliable/guaranteed delivery for transactions—a delivery will not be lost; (2) confidentiality for transactions—only the recipient can open a delivery; and (3) non-repudiation for transactions.

DISCLOSURE OF INVENTION

In accordance with the present invention, a computer-implemented method, system, and computer-readable medium for securely and reliably transmitting a document (3) from a sender (100) to a recipient (300) using a central operations center ("OC") (200). The OC (200) associates a public key as being the sender's public key (402) and associates another public key as being the recipient's public key (404). The OC (200) uses the sender's public key (402), in conjunction with the sender (100) using the sender's corresponding private key (401), to authenticate the sender (100). The OC (200) establishes a first secure connection (2A) between the sender (100) and the OC (200). The OC (200) provides an encryption key, either the recipient's public key (404) or an escrow encryption key (406), to the sender (100), which the sender (100) uses to secure the document (3).

The OC (200) receives, from the sender (100) via the first secure connection (2A), at least a portion (500) of a delivery (510). The delivery (510) contains at least a document (3) that the sender (100) is sending to the recipient (300) and/or other data. The document (3) is any digital file that the sender (100) intends to send to the recipient (300), and could represent, or could include, a cover message or any digital file. The other data may also include system data or header data that accompanies the delivery (3). Thus, the portion (500) of the delivery (510) received by the OC (200) may contain all, some, or none of the document (3) or data. The OC (200) stores the portion (500) of the delivery (510) or the entire delivery (510), if the entire delivery (510) is sent to the OC (200). The OC (200) uses the recipient's public key (404), in conjunction with the recipient using the recipient's corresponding private key (403), to authenticate the recipient (300) and to establish a secure connection between the recipient (300) and the OC (200). The OC (200) then transmits the portion (500) of the delivery (510) or the delivery (510), if the sender (100) transmitted the entire delivery (510) to the OC (200), to the recipient (300) via the secure connection (2B).

Alternatively, the OC (200) could receive a request from the sender (100) to transmit the delivery (510) directly to the recipient (300). To facilitate a direct and secure connection (2C) between the sender (100) and the recipient (300), the OC (200) provides either a notice to the sender (100) that the recipient (300) is available to accept a direct transfer, or a notice to the recipient (300) that the sender (100) is available to transmit the delivery (510), or a large portion thereof (505), directly to the recipient (300).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
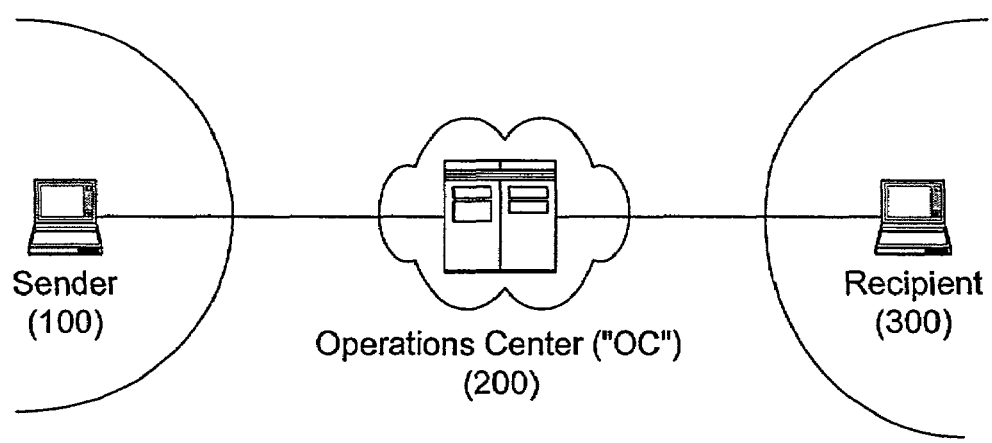
FIG. 1 is a schematic representation of a sender (100) delivering a document to a recipient (300) via a single-node Operations Center (200)

Before turning to the Figures, it is instructive to review some principles of cryptography. Cryptographic algorithms can generally be divided into two classes: symmetric key cryptography and asymmetric key cryptography. The keys themselves are typically large numbers derived from complex mathematical algorithms. These keys are used to encrypt and/or decrypt a message.

Symmetric key cryptography uses a single key to both encrypt and decrypt a message. A message encrypted with a symmetric key can, for all practical purposes, be decrypted only by that same key. For example, if a sender encrypts a message with a symmetric key and sends the encrypted message to a recipient, the recipient can decrypt the message only if he possesses the same key that the sender used to encrypt the message. One of the benefits of using symmetric keys is efficiency. The amount of computing (and therefore, the amount of time) necessary for encrypting and decrypting the message is less than that required for other encryption methods. Thus, the delay experienced by the sender and recipient during the encryption and decryption processes may be minimized.

Asymmetric key encryption, also called public-key encryption, involves a pair of keys—a public key and a private key. Once a user has generated a key pair, the user typically keeps the private key secret but publishes the corresponding public key. The public key and the private key are mathematically related so that one key can decrypt a message encrypted by the other key. However, the mathematical relationship between the keys is sufficiently complex that it is computationally infeasible to derive one key given the other. Thus, if a sender wants to send a message to a recipient in a manner such that only the recipient can read the message, the sender can encrypt the message with the recipient's public key. Since only the recipient's private key can decrypt the message, the sender can be assured that only the recipient can read the message, assuming that the recipient is the only one with access to his private key.

In addition to encrypting messages so that only specific individuals can decrypt the messages, public-key encryption can also be used for other important purposes. For example, public-key encryption allows the recipient of a document to verify the identity of the sender. Assuming that a document is encrypted using the sender's private key, it can be decrypted only by the corresponding public key. Thus, if a recipient can decrypt a document using a certain person's public key, he can be assured that the document was originally encrypted using the corresponding private key. Thus, the recipient can be assured that the certain person was the one sending the document. In other words, the document has been digitally signed by the sender.

However, for this identification to be effective, the recipient must receive the sender's public key in a manner in which the recipient trusts that the key is in fact the sender's public key and not someone else's public key. This trusted transmission of the sender's public key can occur in several ways. For example, the sender could personally give the public key to the recipient. Alternatively, the sender could deliver the public key via a trusted delivery service.

Another possible method is to link the sender to his public key by a digital certificate issued by a trusted third party. A digital certificate is a document that identifies a certain public key as belonging to a certain entity, such as individuals, legal entities, Web servers, and the like, in a trustworthy manner. A trusted third party, known as a certificate authority or CA, typically issues a digital certificate. The CA issues a certificate that identifies, among other things, an entity and that entity's public key. In this manner, the CA acts like a notary, attesting that a certain key belongs to a certain entity. A recipient who trusts the CA can be assured that any message decrypted with that public key must have been encrypted with the corresponding private key, and if only the sender has access to that private key, the recipient knows that the sender sent the message.

Figure 2:
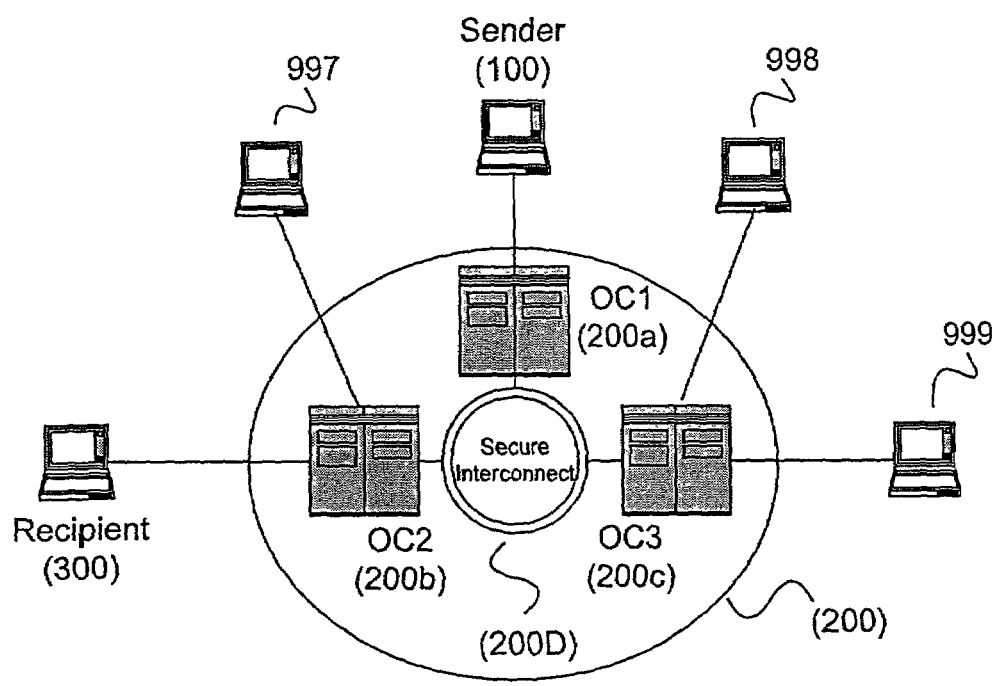
FIG. 2 is a schematic representation of a sender (100) delivering a document to a recipient (300) via a multiple-node Operations Centers (200)

Turning now to the Figures, FIGS. 1 and 2 are schematic representations of systems according to the invention. The systems include a sender 100, Operations Center ("OC") 200 and a recipient 300. The sender 100 wishes to transmit a document, which can be any type of data or electronic file, to the recipient 300 in a secure and reliable manner. The OC 200 acts as a secure intermediary to facilitate the delivery of the document. It will be noted that "sender" 100 can usually be interchanged for "sending system" 100 and that "recipient" 300 can usually be interchanged for "receiving system" 300. Sender 100 and recipient 300 can represent individuals and entities. It will also be noted that there may be a one-to-one, one-to-many, and many-to-one relationship between sender 100 and sending system 100 and between recipient 300 and receiving system 300.

In FIG. 1, the OC 200 includes a single node, which connects to both the sending system 100 and the receiving system 300. In FIG. 2, the OC 200 includes multiple nodes 200A–C networked together by a secure interconnection 200D. The sender 100 connects to a node (200A in this example), and the recipient 300 also connects to a node (200B in this example). As the number of senders and recipients (i.e., the client base) increases, multiple nodes can distribute the tasks described below to better serve the clients. For example, senders and recipients can connect to the node that is most convenient for them. In the multi-node configuration, each node is securely connected 200D to the others to ensure the security and reliability of transmissions between the nodes. For convenience, the following explanations refer to a single-node OC but they are equally applicable to multi-node OCs.

Figure 3:
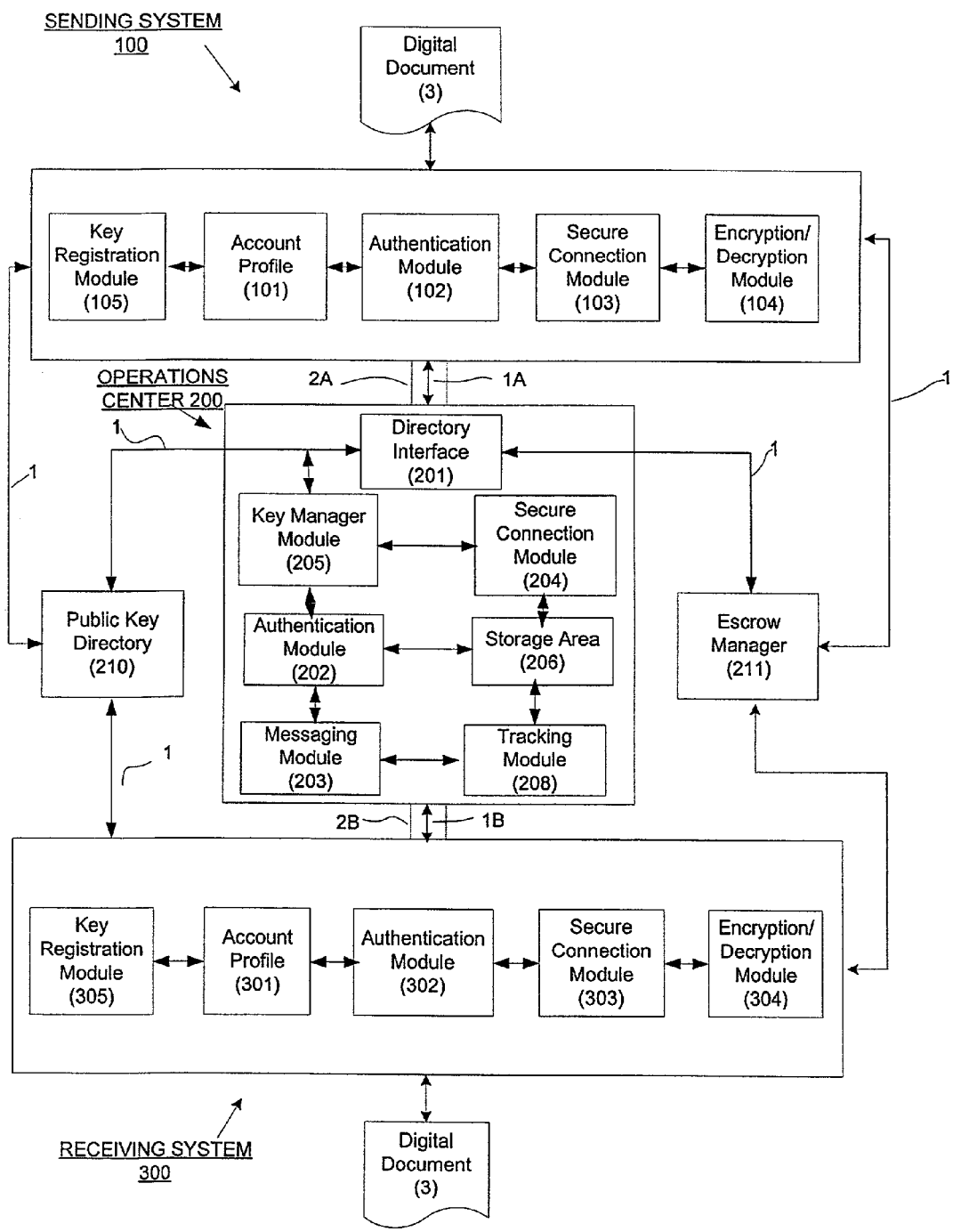
FIG. 3 is a functional block diagram of a preferred embodiment of the system shown in FIG. 1.
Figure 4:
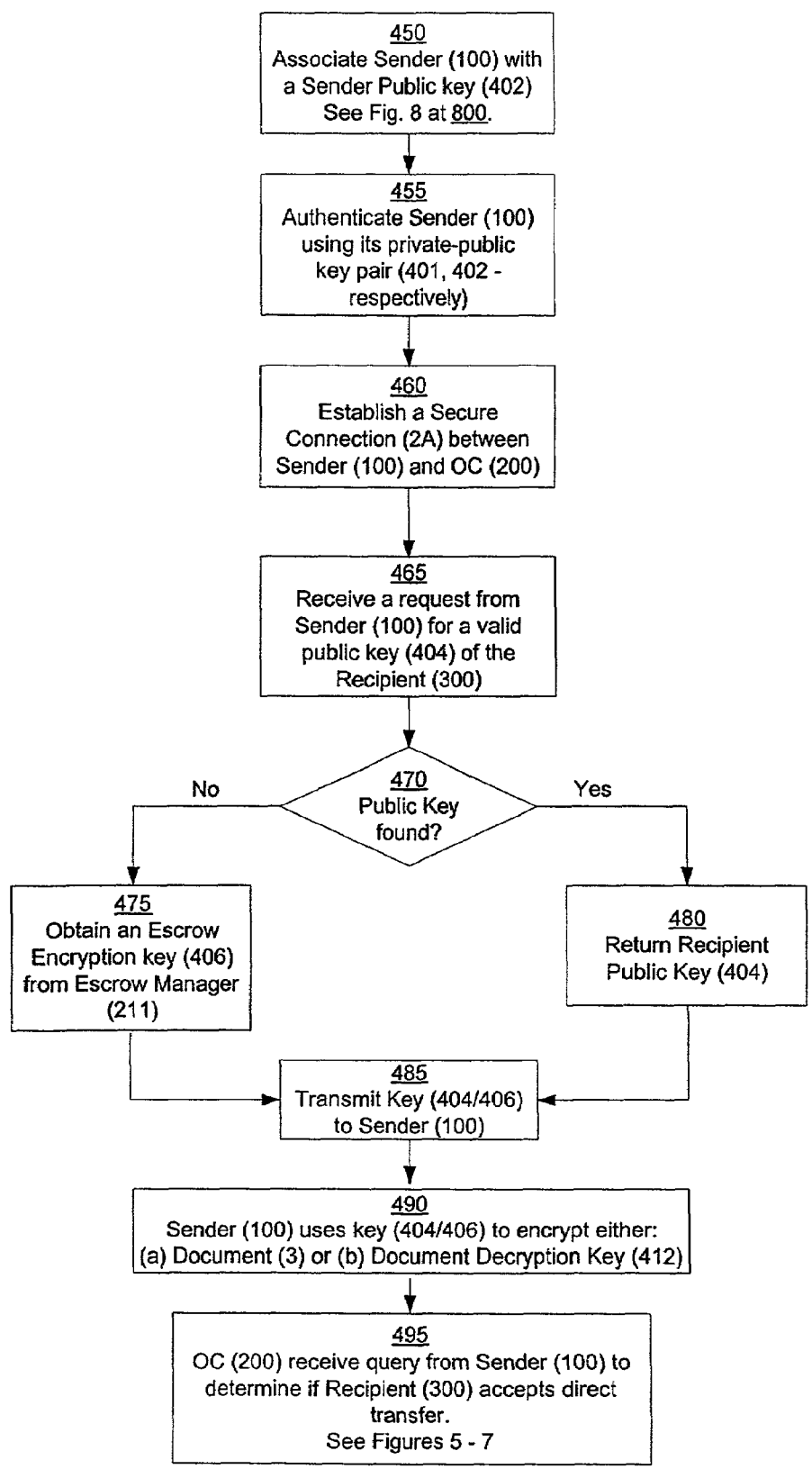
FIG. 4 is a flow diagram illustrating operation of the systems in FIGS. 1–3.

FIG. 3 is a functional block diagram of a preferred embodiment of the system shown in FIG. 1. In this embodiment, each of the sending system 100 and the receiving system 300 includes an account profile 101,301, authentication module 102,302, secure connection module 103,303 and encryption/decryption module 104,304, all of which may communicate with each other. In a preferred embodiment, each of the modules is implemented as software, but can also be implemented as hardware and/or firmware, and the account profile 101,301 is stored locally. Examples of sending and receiving systems 100,300 include desktop computers, portables, PDAs and wireless phones and other digital devices. The systems 100,300 can also include a key registration module 105,305 for registration of the sender 100 and the recipient 300 and for generating new key pairs as part of the key management performed by the OC 200.

The OC 200 includes the following modules: authentication module 202, messaging module 203, secure connection module 204, key manager module 205, and tracking module 208. It also includes a directory interface 201 and local storage 206. All of these components may communicate with each other. In a preferred embodiment, the various modules and the directory interface are implemented as software, but can also be implemented as hardware and/or firmware. An example implementation of OC 200 would include server software running on Windows NT and Sun Solaris systems.

The system in FIG. 3 also includes a public key directory 210 and an escrow manager 211, which is potentially accessible by each of the sending system 100, the OC 200, and the receiving system 300. The public key directory 210 is a directory of public keys. For example, the public key directory 210 may contain digital certificates which associate public keys to entities. The escrow manager 211 will be described in further detail below.

The system in FIG. 3 generally operates according to the flow charts in FIG. 4–FIG. 8. However, more details will be given below concerning various aspects of the system and its operation.

Figure 8:
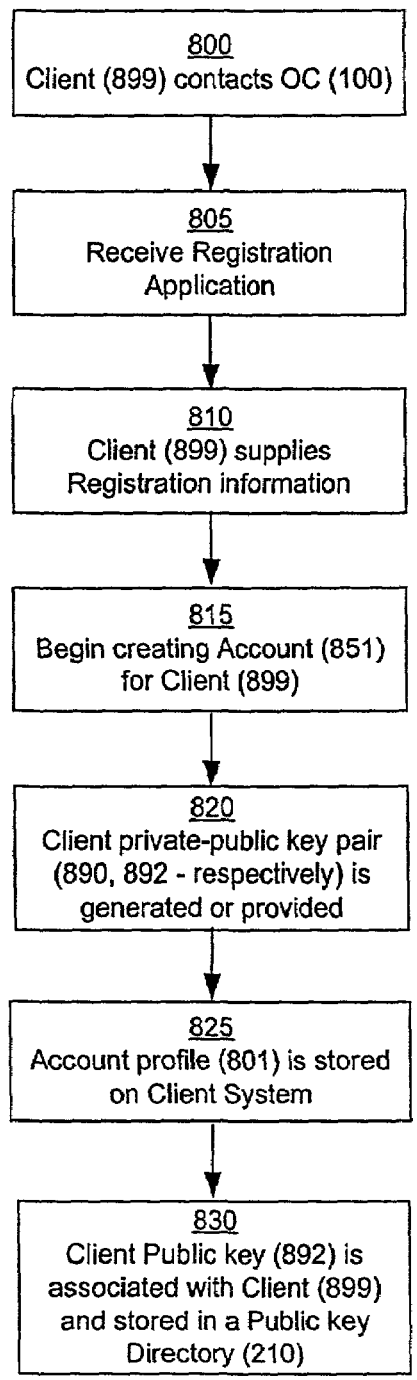
FIG. 8 is a flow diagram illustrating the registration of a client (899) with the OC (200)

Referring to FIG. 8, before a client 899, which could represent either the sender 100 or the recipient 300, can transmit or receive a document through the OC 200, the client 899 first registers with the OC 200. As described in more detail below, the registration process provides the client 899 with an application, which facilitates registration by associating a private-public key pair with the client 899 and by providing the client 899 with the sending system 100 and/or the receiving system 300. As shown in FIG. 3, many of the modules in the sending and receiving systems 100,300 are common and preferably are shared rather than duplicated.

An unregistered client 899 begins the registration process by contacting 800 the OC 200 and obtaining 805 the relevant application. The application can be implemented in software, firmware, hardware, or any combination thereof. In one embodiment, the client 899 contacts the OC 200 via a network connection to a server or Web site operated by the OC 200. Once connected to a Web site operated by the OC 200, the client 899 begins the registration process by selecting a "registration" or "new users" icon or hyperlink. In alternate embodiments, the client 899 could contact the OC 200 by telephone, facsimile, email, or mail and request that the relevant application be sent to the client 899. For example, upon receiving 805 a software application, the client 899 loads the software application onto a personal computer, such as an IBM® PC-compatible personal computer, or a workstation, such as those available from Sun Microsystems® of Mountain View, Calif.

In either of the above embodiments, the client 899 supplies 810 registration information, such as his name and a valid email address, to the OC 200 via a network connection. To protect the information that is supplied during this initial registration process, it is preferred that the connection between the OC 200 and client be secured. The connection can be secured by using a direct network connection or by using a security protocol, such as the Secure Socket Layer protocol. In one embodiment, once the registration information has been submitted to the OC 200, the OC 200 sends a personal activation code to the client 899. For example, the personal activation code is sent in an email message to the email address specified in the registration information. Only the individual with access to that email address will normally receive the personal activation code. The activation code could be a set of characters that the client 899 is required to enter at a specified Web page located at the Web site operated by the OC 200. Alternatively, the activation code could be a unique hyperlink, such as a Uniform Resource Locator ("URL"), that when selected by client 899, causes the client's computer to connect to a unique Web page at the Web site operated by the OC 200. For added security, after the activation code has been entered once, or after the hyperlink has been selected once, the OC 200 no longer accepts that activation code. Alternatively, in addition to the activation code, the activation process may also require the client 899 to provide a shared secret, something only the client 899 and the OC 200 know, further increasing the level of security for the activation process.

In yet a different embodiment, the client 899 may have received 540 (FIG. 5) notification that a delivery is pending, and the activation code could be sent together with the notification, removing the need to submit a Web form to request for the activation code. This method also effectively verifies the email address of the client 899.

After the client 899 has established a network connection to the OC 200 and the activation code, and optionally a shared secret, has been properly supplied, the OC 200 continues the registration process by creating 815 an account 851 for the client 899. To create the account, the OC 200 links the unique activation code to the client's previously supplied registration information. The client 899 is prompted to select and enter an account name and password. Once the client 899 has entered an account name and password, a private-public key pair (890,892, respectively) is generated 820. Alternatively, the client 899 may have an existing key pair which could be used instead of generating a new pair. The public key is added to the client's account information. The account 851 includes the client's registration information, a registered email address, and a public key for the client 899, which will be used to send and receive messages through the OC 200.

In one embodiment, the private-public key pair 890, 892 is generated by the OC 200 and communicated to the client 899. In an alternate embodiment, the private-public key pair 890,892 is generated at the client's computer. In the latter embodiment, the key generating application can be part of the application received by the client 899. For example, the key generation modules 105, 305 can be included as part of the sending and receiving systems 100, 300. It is preferred that the key pair be generated by the client 899 because it eliminates the need to transmit the client's private key 890. Because the private key 890 is never transmitted, a third party cannot intercept it. In this case, only the public key 892 is transmitted to the OC 200. In either embodiment, the client's private key 890 is stored 825 on the client's computer in an account profile file 801 (such as account profile 101, 301 in FIG. 3).

To provide additional security, the client's private key 890 stored in the account profile 801 can be further encrypted. For example, the client's password could be used to encrypt the private key. By encrypting the private key 890 stored on the client's computer, anyone who gains physical access to the client's computer cannot access the client's private key 890 without first entering the correct account name and password.

When the OC 200 obtains the client's public key, it associates the client's public key 892 with the client's account 851, for example, by storing the public key 892 in the client's account 851 file. The OC can also optionally store 830 this associated information in a database or directory 210. Alternatively, the OC 200 can cause a digital certificate, which associates the client's information with the client's public key 892, to be created. The OC 200 could act as the certificate authority ("CA") creating the digital certificate; or, alternatively, the OC 200 could employ a trusted third-party CA to generate the digital certificate. Under either embodiment, the digital certificate can be created as part of the registration processes and therefore is transparent to the client. The public key or digital certificate is stored 830 in a database or directory 210 and referenced when needed, as described below, to authenticate the client 899 or as part of the secure document (3) transmission process.

As described above, the client's account profile 801, which contains the client's private key 890, is preferably generated and stored 825 on the client's computer. Without more, the client 899 can utilize the delivery service from only that computer. Some clients may wish to access the delivery service from multiple computers 997, 998, 999 (FIG. 2). In one embodiment, to allow clients a simple method to access the delivery service from multiple computers 997, 998, 999, the client need only copy the account profile to the additional computers or workstations 997, 998, 999. For example, the client 899 could copy the account profile 801 on to a floppy disk or other computable readable medium or smart cards, and then load that account profile 801 onto any additional computer or workstations 997, 998, 999 from which the client 899 wishes to access the OC 200.

In one embodiment, the public key and/or certificate directory 210 is implemented using an existing directory infrastructure provided, for example, by VeriSign, Inc. of Mountain View, Calif. In alternate embodiments, the public key/certificate directory 210 is implemented using a conventional database system, such as one available from SyBase, Inc. of Emeryville, Calif. In the prior example, the directory 210 may be accessible by the general public, including sender 100 and recipient 300. In the latter example, the directory 210 may be accessed only by the OC 200. Preferably, the public key/certificate directory 210 is accessed by a directory interface 201 (not shown for the sender 100 and receiver 300) using the Lightweight Directory Access Protocol ("LDAP") and is searchable by client 899 registered email address, account name, and/or OC account number. Regardless of implementation of the directory service, the OC 200 uses the public keys in the directory to authenticate clients, and provides key exchange functions for authenticated clients. Key exchange is essential so sender 100 may transparently obtain the public key of recipient 300.

In one embodiment, the OC 200 also operates the key management functions (of issuance, directory maintenance, key retrieval and exchange, key life cycle maintenance) described above. It is beneficial for the OC 200 to handle the complexities involved in key issuance, certification, storage, searching, rollover, etc. Because the OC 200 acts as a central key manager, it can implement and control the practices related to the key, such as periodically facilitating the new issuance of key pairs to maintain the integrity of keys. Also, since the OC 200 maintains the public keys/certificates, the OC 200 can perform real-time key revocation. Real-time revocation prevents communications from being sent using compromised or invalid keys. Furthermore, since the OC 200 maintains the public keys/certificates, a sender 100 needs to specify only a recipient 300's registered email address in order to obtain the recipient's public key.

In an alternate embodiment, a trusted third party or trusted third parties perform aspects of the public key/certificate management on behalf of the OC 200. For example, a trusted third party could issue and maintain digital certificates. When a sender 100 wants to send a message to a recipient 300, the OC 200 would obtain the recipient's public key certificate from the third party rather than maintaining the certificate itself. One skilled in the art will be aware that key and certificate management can be handled by trusted third parties without deviating from the spirit of this invention.

As depicted in FIG. 3, a sending system 100 facilitates the secure and reliable transmission of an electronic document 3 using the OC 200. Software for implementing this sending system 100 can be supplied on a computer-readable medium, such as with the registration software, or can be received from the OC 200 via a network connection. As described in more detail below, the sending system 100 authenticates a sender and the OC 200, creates a reliable connection 2A between the sender 100 and the OC 200, and the OC 200 provides a key or keys to the sender 100 which the sender 100 uses to secure the document 3 before it is transmitted to the recipient 300.

A sender uses the sending system 100 to send an electronic document 3 to the recipient's receiving system 300 by connecting to the OC 200 through a network connection 1A. In one embodiment, a direct line between the parties 100, 200 provides reliability and security, but direct network connections are costly and in many instances impractical.

In an alternate embodiment, the sender 100 connects to the OC 200 via a network connection 1A, such as the Internet. Once connected to the OC 200, the sender 100 begins the strong authentication (e.g. password protection plus asymmetric key authentication) process by entering her/his username and password, which the sender 100 selected as part of the registration process described above. The account profile module 101 verifies the sender 100's username and password. If the username and password are correctly entered, the account profile module 101 grants access to the sender 100's private key and the strong authentication process 455 (FIG. 4) continues.

The sending system 100 automatically continues the strong authentication process 455 by use of an authentication module 102. Since this authentication process is automatically performed, it is transparent to the sender 100. The sender's authentication module 102 authenticates 455 the sender 100 to the OC's authentication module 202 by sending the OC 200 a digital signature generated using the sender's private key, thus proving that the sender 100 is who he claims to be.

The digital signature may be generated in many ways. In one approach, the sender simply encrypts some meaningful data using his private key and sends this to the OC 200. If the OC 200 can use the sender 100's public key to decrypt the received data package, the OC 200 knows that the sender 100 is the one who encrypted the data package.

In a second approach, the sending system 100 randomly generates some data to digitally sign. A hash algorithm creates a message digest, or hash, of the randomly generated data. A hash algorithm is a method of transforming a variable length message, in this case the randomly generated data, into a fixed length number. This fixed length number is referred to as the hash or message digest of the original message. For this message digest to be useful as part of a digital signature, the contents of the message must not be practically ascertainable from the message digest number. Thus, hash algorithms are typically one-way functions, which can easily generate a hash from a message, but which cannot, for all practical purposes, generate the original message given the hash. The message digest's usefulness as a digital fingerprint of a message also depends upon its ability to correlate uniquely to the original message. Ideally, a hash algorithm is a strictly one-to-one function so that each hash number can only be generated by one, and only one, message. Any change in the message, no matter how insignificant, will generate a different hash number. If a hash algorithm generates the same hash for two different messages, a collision exists which could compromise the usefulness of the hash. Thus, one measure of a hash algorithm's usefulness is the frequency at which more than one message will generate the same hash number. In practice, useful hash algorithms may generate collisions in theory but the probability is low enough as to be practically negligible. Well-known one-way hash algorithms that are useful for digital signing include MD2, MD5, and SHA-1.

The hash of the data package, along with information about the hash algorithm used to generate the hash, is then encrypted with the sender's private key. The sending system 100 sends the original data package as well as the encrypted hash to the OC 200. The OC 200 uses the sender's public key to decrypt the hash. The OC 200 obtains the sender's public key by searching the public key directory 210. To verify the integrity of data, the OC 200 uses the same hash algorithm on the original randomly generated data. If the hash generated by the OC 200 does not match the decrypted hash, this indicates a problem. The digital signature may not have been created with the sender's private key or the data may have been tampered with since it was signed by the sender 100. If the hashes match, the OC 200 can be reasonably assured that the sender 100 sent the message.

Once the OC 200 has strongly authenticated 455 the identity of the sender 100, the sending system 100 can optionally authenticate the identity of the OC 200. The OC 200's authentication module 202 authenticates to the sending system's authentication module 102 in a similar manner as the sender 100 was authenticated, that is, by digitally signing some randomly generated data. The sending system 100 obtains the OC 200's public key by searching the public key directory 210. Alternatively, the sending system 100 could obtain the OC 200's public key in some other manner, such as having it coded into the sending system 100.

After the mutual strong authentication, a secure connection 2A is established 460 between the parties 100,200. A direct line can provide a reliable and secure connection between the parties 100,200; however, direct lines are expensive and are not always available. In the example of FIG. 3, the secure connection 2A is established 460 by use of a virtual private network ("VPN") or an SSL connection. A VPN connection 2A could utilize protocols designed for layer 2 of the Open Systems Interconnection ("OSI") network architecture model, such as the Layer 2 Tunneling Protocol ("L2TP") or Point-to-Point Tunneling Protocol ("PPTP"). Alternately, the VPN connection 2A could be established using an OSI layer 3 protocol such as IP Security protocol ("IPSEC"). Alternatively, the VPN could be established at one of the layers in the host process subset (layers 5 through 7) of the OSI network architecture model. One benefit of establishing a VPN connection 2A at the host process subset layers is that present VPN systems employ protocols in layers 2 and 3. If the sender's computer system 100 is part of a network that already utilizes a VPN, a conflict may be created between the existing VPN and the VPN connection 2A attempting to be established 460 between the sending system 100 and the OC 200. By creating a VPN connection 2A at the host process subset layers, the sender 100 and the OC 200 can establish a VPN independent of any other VPN used by sender 100's network.

In one approach, the VPN connection 2A is created at the application level by using a session key and Hypertext Transfer Protocol ("HTTP"), Transmission Control Protocol ("TCP"), or File Transfer Protocol ("FTP"). The secure connection modules 103 and 204 establish the VPN, by performing the following functions. Either the sending system's module 103 or the OC 200's module 204 generates a session key. Once a session key has been generated, the key-generating party transmits it via the network connection 1A to the other party by encrypting the session key with the receiving party's public key. For example, the sending system's secure connection module 103 generates a session key and encrypts it with the OC 200's public key. The encrypted session key is transmitted to the OC 200's secure connection module 204, which decrypts the session key. Once both parties have the session key, they communicate via a VPN connection 2A that encrypts the application data with the session key. This process allows a compatible VPN tunnel to be created regardless of existing VPN setup in the sending system 100, as described in commonly-assigned U.S. Provisional Patent Application No. 60/242,015, "Application VPN with Application Proxies," by Eng-Whatt Toh, filed 19 Oct. 2000, which subject matter is incorporated herein by reference in its entirety.

The VPN connection 2A has many advantages. One advantage is that data transmissions that occur over the VPN connection 2A carry additional encryption since they have been encrypted by the VPN encryption key (i.e., the session key). Second, the VPN 2A creates a reliable connection between the sender 100 and OC 200. Traditional Internet email communications are routed through several email servers, which are owned and operated by a number of parties. Since no single company or entity owns the entire delivery chain for the email, no one company or entity can guarantee reliable delivery or integrity of the message. The VPN 2A formed between the sending system 100 and the OC 200 creates a point-to-point connection and is not forwarded through any Internet email servers. This method is much more reliable than traditional Internet email and allows the OC 200 to guarantee delivery of any message regardless of message type or size. In addition, it does not create an unnecessary audit trail.

As a final example, the VPN-enabled OC 200 acts as central switch that can effectively extend the VPN connection 2A from the sending system 100 to the receiving system 300. Since a VPN connection is point-to-point, it is infeasible to produce a dynamic VPN connection that allows every possible sender 100 to create a VPN to every possible recipient 300, without having a central key manager such as the OC 200. However, this result can in effect be achieved by having the OC 200 act as a central switch between sending system 100 and receiving system 300. Each client, whether sending an electronic document or receiving one, connects to the OC 200 by forming a VPN tunnel 2A,2B. In this manner, a VPN connection 2A,2B is effectively created from the sending system 100 to the receiving system 300 via the OC 200. This structure enables the OC 200 to connect any sender 100 with any recipient 300 using a secure and reliable delivery system.

Once the secure tunnel 2A is formed between the sending system 100 and the OC 200, the sending system 100 obtains the recipient 300's public key. The sending system 100 can obtain the recipient 300's public key by searching the public key directory 210. Alternatively, the sending system 100 queries 465 the OC 200 for the recipient 300's public key 404. A directory interface 201 obtains 480 the recipient 300's public key 404 from the public key directory 210, which is transmitted 485 to the sending system 100 via the secure connection 2A. The key management module 205 monitors the public keys to ensure that the OC 200 returns to the sending system 100 the recipient 300's current public key 404.

The foregoing explanation assumed that the recipient 300 has a valid public key 404. The recipient 300 may not have a valid public key, for example, if the recipient 300 has not registered with the OC 200 prior to the sending system 100 transmitting the document 3, or if the recipient 300's public key has been revoked for some reason. In either case, when the sending system 100 requests 465 the recipient 300's public key, none will exist. To solve this problem, the OC 200 and/or the escrow manager 211 can securely hold the message in escrow until the recipient 300 registers with the OC 200 or until a new public-private key pair is generated. When the sending system 100 requests 465 the recipient 300's public key and none is found in the public key directory 210, the escrow manager 211 provides 475 an escrow encryption key 406, which is transmitted 485 to the sending system 100.

Whether the sending system 100 receives the recipient's public key 404 or an escrow encryption key 406, the sending system 100 uses the key 404 or 406 to secure the document 3. In one embodiment, the sending system's encryption module 104 encrypts 490 the document 3 using whichever key 404 or 406 was transmitted 485 to it. Alternatively, instead of encrypting the document with the public key 404 or escrow encryption key 406, the sending system's encryption module 104 could encrypt the document 3 using other cryptographic standards, for example, Public Key Cryptography Standard #7. That is, the sending system 100 uses a document encryption key 410 to encrypt the document 3, and uses the escrow encryption key 406 or recipient public key 404 to encrypt a document decryption key 412. The document encryption key 410 is a key, preferably generated by the sending system 100, which the sending system 100 uses to encrypt the document 3. Preferably, the document encryption key 410 is a symmetric key (in which case the document encryption key 410 and the document decryption key 412 are the same key) because of its reduced time requirements needed for the encryption/decryption process as compared to asymmetric keys. But alternatively, the document encryption key 410 could be an asymmetric key. In the case of an asymmetric document encryption key 410, the sending system 100 will encrypt the document 3 with the document encryption key 410 and will include the document decryption key 412 encrypted with the recipient's public key 404 or encrypted with the escrow encryption key 406 as part of the delivery 510. In either case, the escrow encryption/decryption keys 406,407 are used for encrypting 490 the document decryption key 412 rather than encrypting/decrypting the document 3.

The delivery 510 to be transmitted to the recipient 300 comprises at least the encrypted document 3. The delivery may also include an encrypted document decryption key 412, if a document encryption key 410 was used to encrypt the document 3. If an escrow encryption key 406 was employed by the sending system 100, the OC 200 or escrow manager 211 may also include the escrow decryption key 407 as part of the delivery 510. The delivery 510 can also include addition data. For example, the delivery 510 can include a cover letter or message, the header information of an email message (for example, the sender 100 and the recipient 300 names or aliases, email addresses of the sender and the recipient, message "Re:" data, and so forth), and tracking information, such as a unique tracking number. The delivery can also include one or more message digests, such as a message digest of the document 3, and one or more digital signatures, such a digital signature of the sender 100. The message digests and/or digital signatures allow for sender authentication, non-repudiation, and message integrity. For example, the document 3 can be digitally signed. The digital signature allows for sender authentication. The digital signature can be generated in a similar manner as described above during the authentication phase. Alternatively, the sending system 100 can digitally sign the document 3. In another alternative, the contents of the document 3 are mathematically hashed using a one-way hash function to create a message digest or hash number. The hash number is then encrypted using the sender 100's private key 401. This encrypted hash number serves two functions. First, it functions as a digital signature. Second, the hash number can be used to verify that the document 3 was not altered during transmission. Once the receiving system 300 receives and decrypts the document 3 and the hash (if it was sent in encrypted form), the receiving system 300 hashes the document 3. If the hash numbers match, then the document 3 was not altered. This latter embodiment allows for non-repudiation by the sender 100 because the document 3 arrived signed and unaltered. The above-mentioned items can be encrypted in the same manner as the document 3 and delivered as part of the delivery 510. Transmission of the delivery 510 to the recipient 300 can occur in a number of ways, which will be detailed below.

Figure 5:
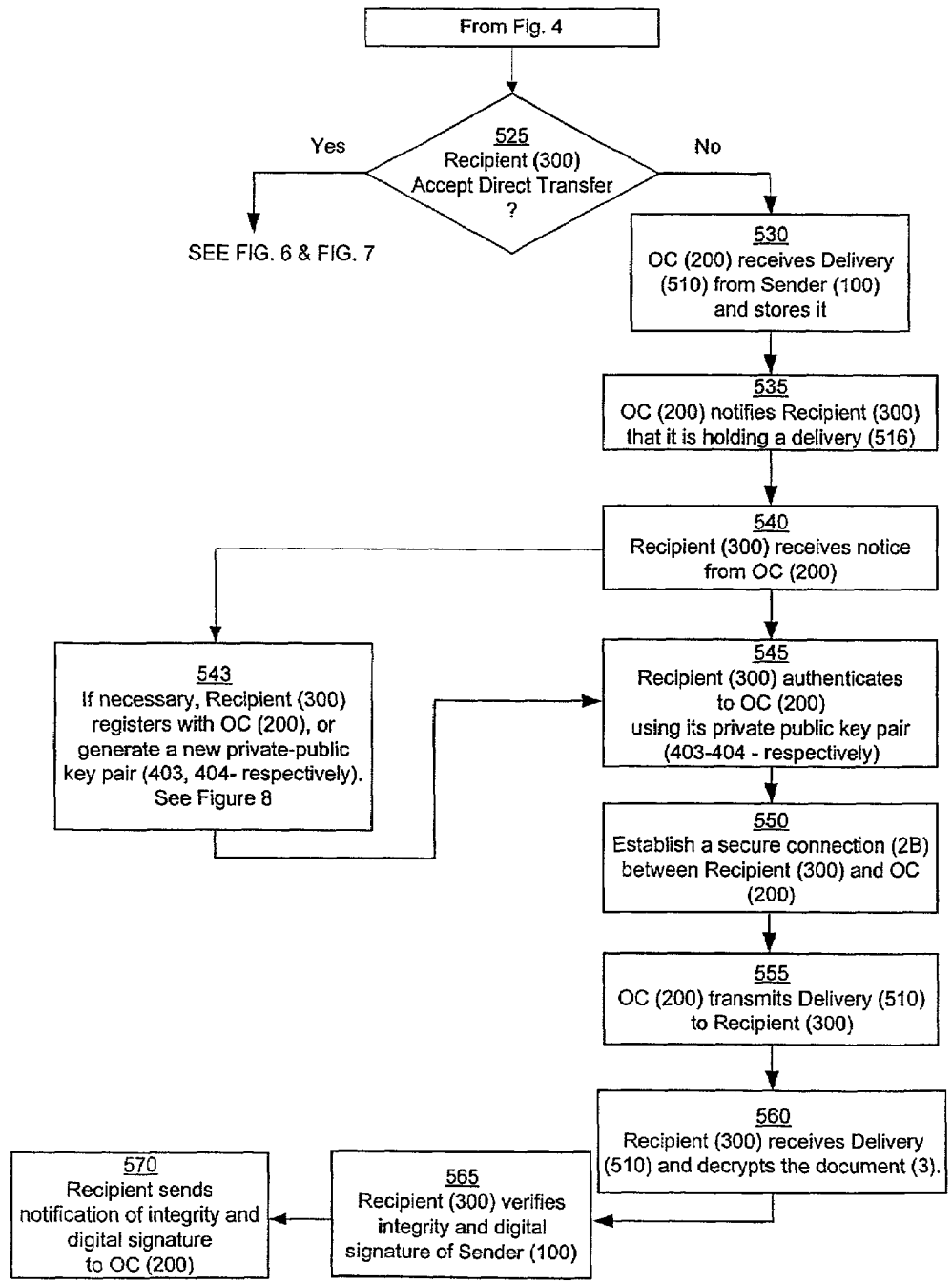
FIG. 5 is a flow diagram illustrating operation of the systems in FIGS. 1–3 in which the delivery (510) is sent via the OC (200)

Referring now to FIG. 3 and FIG. 5, if the recipient 300 does not accept 495 direct transfer of the delivery 510, the OC 200 can act as a staging area for the delivery 510. The OC 200 receives 530 the delivery 510 from the sending system 100 via the first secure connection 2A. The OC's messaging module 203 receives the delivery 510, and the OC 200 stores 530 the delivery 510 in a storage area 206.

The OC 200 notifies 535 the recipient 300 that a delivery 510 has been addressed to the recipient 300 and awaits transmission pending secure connection with the OC 200. The recipient 300 could be notified by email, facsimile, telephone, courier or mail service, or the like. In the embodiments in which an escrow encryption key 406 is used as part of the delivery 510 encryption process, before the recipient can receive the delivery 510 from the OC 200, the recipient 300 must register 543 with the OC 200 and provide an existing key-pair or must generate 543 a new key pair. The registration of the recipient 300 occurs in the same manner as described above for the client 899. To generate a new key pair, the key manager module 205 prompts the key registration module 305 to generate a new private-public key pair (403, 404—respectively). The public key 404 is transmitted to the OC 200, is associated with the recipient 300, and is stored in the public key directory 210 for use with future deliveries. The recipient account profile 301 is updated to include the current private key 403. In the embodiments in which the recipient had a valid public key 404 which was used as part of the delivery 510 encryption process, the recipient 300 can proceed to receive the delivery 510 from the OC 200.

With its valid key pair 403, 404, the recipient 300 can obtain the delivery 510 from the OC 200. The recipient 300 accesses its private key 403 stored in the account profile module 301, such as by entering an account name and password, and connects to the OC 200 via a network connection 1B. In the same manner as discussed above for the sending system 100, the receiving system 300 strongly authenticates 545 to the OC 200 and, optionally, the OC 200 strongly authenticates to the receiving system 300. As with the sending system 100, a secure connection 2B, such as an SSL connection or a point-to-point VPN tunnel, is formed 550 between the OC 200 and receiving system 300. The receiving system 300 can then request the delivery 510. The OC 200's messaging module 203 transmits 555 the delivery 510 from the OC 200's storage area 206 to the receiving system 300 via the secure connection 2B. The receiving system's encryption/decryption module 304 decrypts 560 the document 3 to return it to an intelligible form.

The process of decrypting 560 the document 3 depends upon the method employed by the sending system 100. If the sending system 100 encrypted the document 3 with the recipient's public key 404, the receiving system 100 decrypts the document 3 using the recipient's private key 403. If the sending system 100 encrypted the document 3 using a document encryption key 410, the receiving system 300 uses its private key 403 to decrypt the document decryption key 412 and then uses the document decryption key 412 to decrypt the document 3.

In the embodiments in which an escrow encryption key 406 was used by the sending system 100, the OC 200 or escrow manager 211 could transmit 555 the escrow decryption key 407 as part of the delivery 510 to the receiving system 300. Alternatively, the OC 200 or escrow manager 211 could decrypt the document 3 and re-encrypt it with the recipient 300's public key 404 prior to transmitting 555 it to the recipient 300. In another embodiment, the sending system 100 uses a document encryption key 412 to encrypt the document 3. The sending system 100 encrypts the document decryption key 412 using the escrow encryption key 406, which could represent the escrow manager's public key, which the sending system 100 obtains from one of the following: its own encryption module 104, the public key directory 210, the OC 200, and the escrow manager 211. The sending system 100 transmits the encrypted document 3 and the encrypted document decryption key 412 to the OC 200 or the escrow manager 211 as the delivery 510. When the recipient 300 requests the delivery 510, the OC 200 or escrow manager 211 decrypts the document decryption key 412 using the escrow decryption key 407, which could represent the escrow manager's private key, and re-encrypts the document decryption key 412 with the recipient 300's public key 404. Then, the escrow manager 211 or OC 200 messaging module 203 sends the delivery 510, which includes the re-encrypted document decryption key 412 to the receiving system 300. The receiving system 300 then decrypts the document decryption key 412 with its private key 403 and uses that key 412 to decrypt the document 3.

For examples of key escrow systems, see commonly-assigned U.S. Provisional Application Ser. No. 60/242,014, "Method For Fast Escrow Delivery," by Chee-Hong Wong, Kok-Hoon Teo, See-Wai Yip, and Eng-Whatt Toh, filed 19 Oct. 2000, and commonly-assigned U.S. patent application Ser. No. 09/332,358, "Simplified Addressing for Private Communications," by Eng-Whatt Toh and Peng-Toh Sim, filed 10 Jun. 1999, which subject matter is incorporated herein by reference in its entirety.

The decryption module 304 can also decrypt (if encrypted) and verify 565 the digital signature and message digests, if those items are included with the delivery 510. In order to verify the digital signature, the decryption module 304 uses the sender 100's public key. The decryption module can obtain the sender 100's public key by accessing the public key directory 210, by receiving it as part of the delivery 510, or by requesting the public key from the OC 200. The OC 200 can retain the sender 100's public key from the authentication processes with the sending system 100; or alternatively, the OC 200 can obtain the sender 100's public key by searching the public key database 210. The receiving system 300 could also optionally notify 570 the OC 200 of the results of the verification of the integrity and/or digital signatures.

Figure 6:
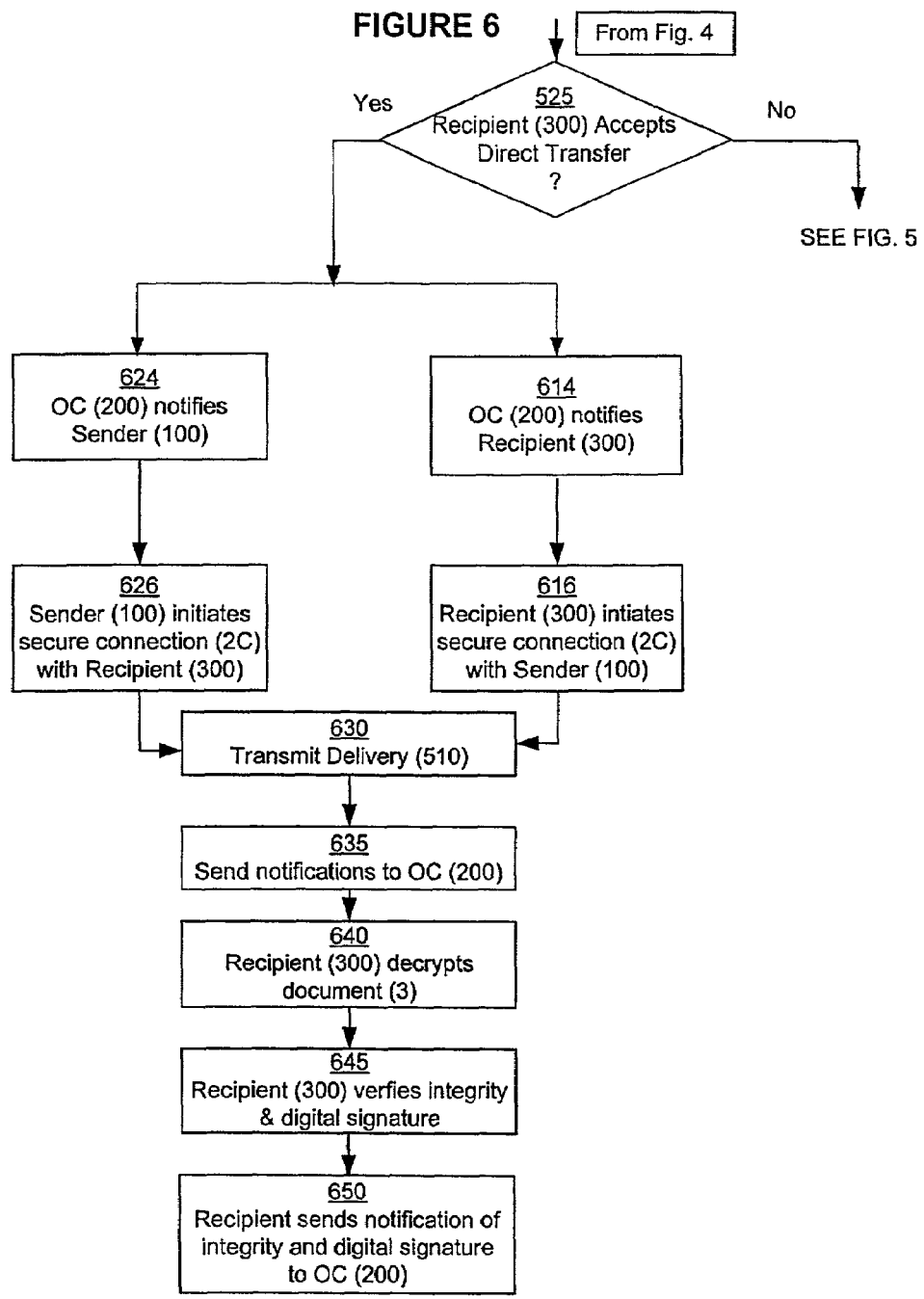
FIG. 6 is a flow diagram illustrating operation of the systems in FIGS. 1–3 and 9, in which the sender (100) and the recipient (300) establish a direct and secure connection (2C) between them.
Figure 7:
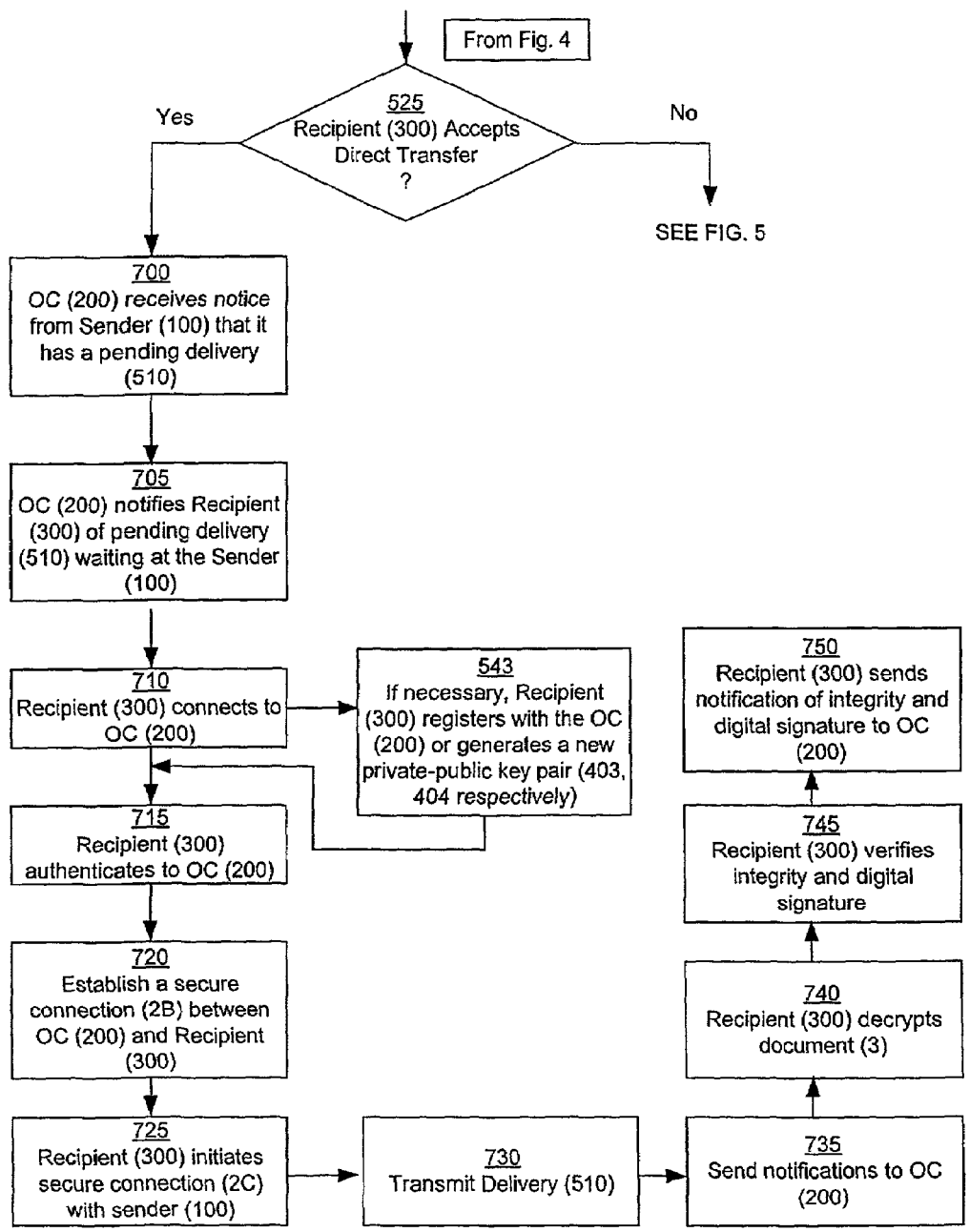
FIG. 7 is a flow diagram illustrating operation of the systems in FIGS. 1–3 and 9, in which the sender (100) and the recipient (300) establish a direct and secure connection (2C) between them.

In FIGS. 6 and 7, alternate embodiments are depicted in which the receiving system 300 accepts 525 direct transfer. In the previous embodiments, the entire delivery 510 was sent via the OC 200. In the alternate embodiments of FIGS. 6 and 7, the delivery 510, or a large portion 505 (See FIG. 9) of it, is sent directly from the sending system 100 to the receiving system 300 rather than via the OC 200. These embodiments are advantageous because they reduce the volume of data that flows through the OC 200. As with the previous embodiments, the OC 200 still acts as a central key manager by providing the keys necessary to ensure proper authentication, secure connection setup, encryption, and the like.

FIG. 6 depicts peer-to-peer embodiments wherein the sending system 100 transmits the delivery 510 directly to the receiving system 300 via a direct and secure connection 2C (FIG. 9), such as a peer-to-peer VPN connection or SSL connection. For example, the sending system 100 queries 525 the OC 200 to determine if the receiving system 300 accepts direct transfers. The OC 200 can determine if the receiving system 300 is available to accept a direct delivery by, for example, determining if the receiving system 300 is presently connected to the OC 200. If the receiving system 300 is available to accept a direct delivery and is connected to the OC 200, the sending system 100 is notified 624 by the OC 200 and initiates 626 a secure connection 2C between the sending system 100 and the receiving system 300. Preferably, the secure connection 2C is an SSL connection or a peer-to-peer VPN connection. Alternatively, the OC 200 could notify 614 the recipient 300 that the sender 100 has a delivery 510 pending, and the receiving system 300 initiates 616 a secure connection 2C with the sending system 100.

With the direct and secure connection 2C established, the sending system 100 transmits 630 the delivery 510 to the receiving system 300. Optionally, the OC 200 exchanges acknowledgements 635 with sending and receiving systems 100, 300 that transfer 630 of the delivery 510 was successful. These acknowledgements could include acknowledgements of the tracking items discussed below.

With the delivery 510 transferred to the receiving system 300, the receiving system's encryption/decryption module 304 decrypts 640 the document 3. Optionally, the delivery 510 or document 3 integrity is verified 645, as well as verification of any digital signatures which were included as part of the delivery 510. The receiving system 300 could also optionally notify 650 the OC 200 of the results of the verification of the integrity and/or digital signatures.

If the receiving system 300 does not accept direct deliveries or is otherwise unavailable to presently accept the delivery 510, the sending system 100 has at least two options. The first option is the set of embodiments described above with reference to FIG. 5. Thus, the sending system 100 sends all of the delivery 510 via the OC 200, as previously described. Alternatively, the sender 100 can notify the recipient 300 that the sender has a delivery 510 which the sender 100 wishes to transmit via a direct and secure connection 2C.

FIG. 7 depicts an embodiment for sending the delivery 510 via a direct and secure connection 2C (FIG. 9), such as a peer-to-peer VPN connection or SSL connection, when the receiving system 300 is not presently available to receive the delivery 510. The sending system 100 notifies 700 the OC 200 that the sending system 100 has a delivery 510 for the receiving system 300. The OC 200 notifies 705 the recipient 300 that the sender 300 has a pending delivery 510. The recipient connects 710 to the OC. If necessary, the recipient 300 registers 543 with the OC 200, as explained above in reference to FIG. 8, or generates 543 a new private-public key pair 403,404—respectively, which has also been detailed above in reference to FIG. 5.

With its valid key pair, the recipient strongly authenticates 715 to the OC 200. Optionally, the OC 200 can authenticate to the receiving system 300. A secure connection 2B is established 720 between the receiving system 300 and the OC 200. The receiving system 300 initiates a secure connection 2C between itself and the sending system 100. With the secure peer-to-peer connection 2C established, the receiving system 300 retrieves the delivery 510 from the sending system 100. Optionally, the OC 200 exchanges acknowledgements 735 with sending and receiving systems 100,300 that the delivery transmission was successful. These acknowledgements could also include acknowledgements of the tracking items discussed below.

With the delivery 510 transferred 730 to the receiving system 300, the receiving system's encryption/decryption module 304, decrypts 740 the document 3. Optionally, the delivery 510 or document 3 integrity is verified 745, as well as verification of any digital signatures which were included as part of the delivery 510. The receiving system 300 could also optionally notify 750 the OC 200 of the results of the verification of the integrity and/or digital signatures.

Figure 9:
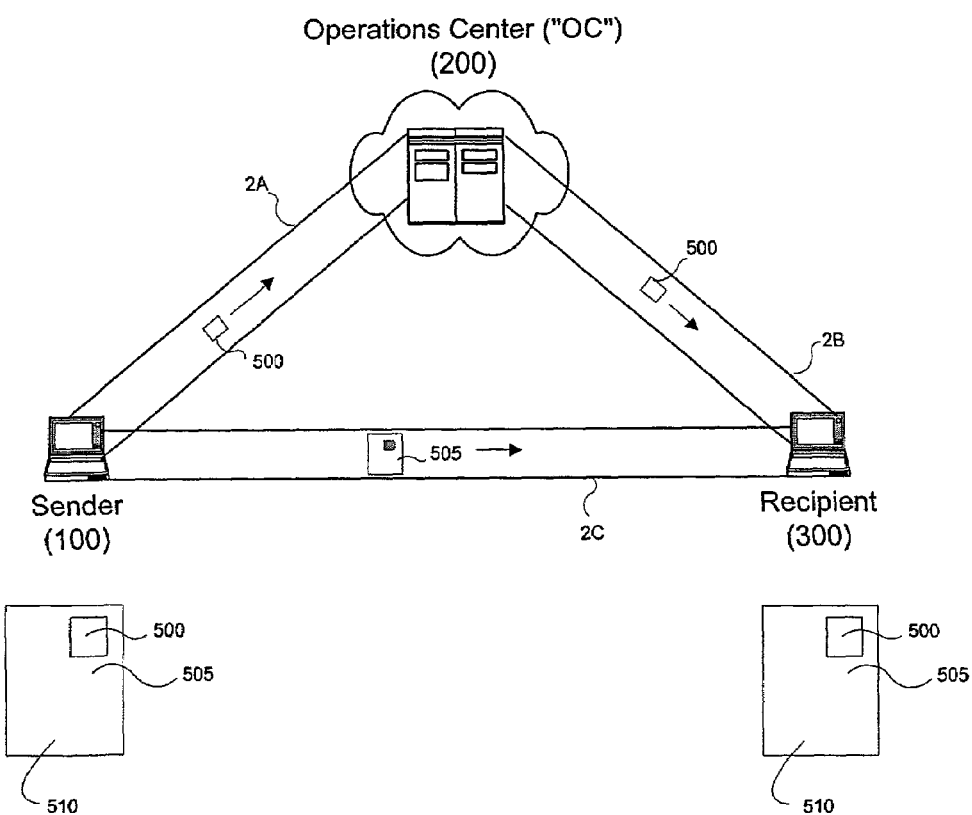
FIG. 9 is a schematic representation of a sender (100) transmitting a delivery (510) to a recipient (300) by transmitting at least a portion of the delivery (500) via an Operations Centers (200) and the remainder of the delivery (505) via a secure connection (2C) with the recipient (300).

As graphically depicted in FIG. 9, alternative embodiments of the above peer-to-peer embodiments involve at least a portion of the delivery 500, such as a packet, the header information, the last byte of the delivery 510, or the decryption key or keys required to decrypt the delivery 510 or the document 3, being sent via the OC 200. The portion of the delivery 500 can be any portion of the delivery 510, recalling that the delivery includes at least the document 3, but which could also include additional data as explained previously.

The embodiments described above in reference to FIG. 6 and FIG. 7 can be readily adapted so that a portion of the delivery 500 is sent via the OC 200, and the remainder of the delivery 505 is transmitted directly from the sender 100 to the recipient 300 via a direct and secure connection 2C. For example, the notification 624,700 received by the OC 200 from the sending system 100 of a pending delivery 510 could include the small portion of the delivery 500 that is necessary to complete or to open the delivery 510. For example, the OC 200 can transmit this portion of the delivery 500, with the notice to the recipient 300 of the pending delivery, such as at step 614. Furthermore, the OC 200 could also transmit the portion of the delivery 500 prior to the recipient 300 receiving the remaining portion of the delivery 505, or the OC could transmit portion of the delivery 500 after the recipient 300 has acknowledged receiving the remaining portion of the delivery 505, such as at step 635,735.

These embodiments are advantageous because the OC 200 does not need to rely entirely on the notifications/acknowledgements 635,735 sent by the sending system 100 and receiving system 300 to track the transmission of the delivery 510. Because a portion of the delivery 500 is sent via the OC 200, the OC 200 can track and time-stamp the portion of the delivery 500 just as it would track the delivery 510, if the entire delivery 510 were transmitted via the OC 200. The OC's 200 involvement in transmitting the portion of the delivery 500 mitigates problems when the notifications of the transmission and receipt of the delivery 510 are altered or not sent by either the sending or receiving systems 100,300 respectively. With the OC 200 at least partially involved in the transmission of the delivery 510, neither party 100,300 can repudiate the delivery 510 and the tracking.

As mentioned above, in addition to securely and reliably transmitting the delivery from the sender 100 to the recipient 300, the above embodiments can also include delivery 510 tracking and notification. Tracking features are implemented by the tracking module 208 and include, for example, time-stamping the document 3 at main points throughout the delivery process. The main points through the delivery process could include the time at which the delivery 510, or a portion of it 500, was transmitted to the OC 200 or the escrow manager 211; the time at which the recipient 300 received the delivery 510, or any portion 500,505 of it; and the time at which the recipient 300 successfully decrypted the document 3. For example, when the sending system 100 transmits the delivery 510, or any portion thereof 500, to the OC 200, a tracking module 208 assigns a unique tracking number to the delivery 510, or any portion thereof 500, and time stamps it. The tracking module 208 then tracks the delivery 510, or any portion thereof 500, throughout the delivery process.

Another feature that can be performed by the OC 200 is the notification process. For example, the OC 200 can notify the recipient 300 that a delivery 510 has been received or is pending at the sender 100. Once the delivery 510 has been transmitted to the OC 200 or to the escrow manager 211, the messaging module 203 notifies the recipient 300 that a delivery 510, or at least a portion of the delivery 500, has been received. In an alternate embodiment, the messaging module 203 alerts the recipient 300 of the waiting delivery 510, or any portion thereof 500,505, by email notification, using for example, the email address supplied during the registration process. However, those skilled in the art will recognize that other notification systems and methods could be used without departing from the spirit of the invention. For example, the receiving system 300 may include a notification client (not shown) that receives user datagram protocol ("UDP") notifications from the notification module 207. Upon receipt of UDP notifications, the notification client generates an audible or visual desktop notification, such as a chime, a blinking icon, a pop-up dialog box, or the like. Other forms of notification could include voice notification via a voice synthesis module, a pager notification, or a facsimile notification.

The sender 100 can likewise obtain notification. For example, the sender 100 can be notified that a notice was sent to the recipient 300. Additional notifications can include notifying the sender 100 that the recipient 300 has received the delivery 510 or the at least portion of the delivery 500. The sender 100 could also be notified that the recipient 300 has decrypted the document 3. If a delivery 510, or portion of the delivery 500, was delivered to the OC 200 and remained there for a set time period, for example thirty (30) days, and was never requested by the recipient 300 to be delivered, a notification to the sender 100 can be sent to indicate that the delivery 510, or portion thereof 500, was never requested. Finally, a notification could be sent to the sender 100 indicating that the OC 200 was unable to transmit the delivery 510, or the at least a portion of the delivery 500, to the recipient 300. The sending system 100 could receive notification in the same manner as was described above for the receiving system 300.

Each of the above notifications can be time stamped by the OC 200 to provide not only notice but also timing information. The tracking and notification features, including the time stamping, allows for further non-repudiation because both the sender 100 and the recipient 300 can track the delivery 510 throughout its transmission. These features also support the reliability of the present invention. Alternative embodiments could use other notification and tracking features.

The above description is included to illustrate the operation of the preferred embodiments and is not meant to limit the scope of the invention. The scope of the invention is to be limited only by the following claims. From the above discussion, many variations will be apparent to one skilled in the art that would be encompassed by the spirit and scope of the present invention.

What is claimed is:

1. A computer-implemented method for securely delivering a document from a sender to a recipient, the method comprising an operations center (OC) performing the steps of:
  registering the sender in a sender registration record and associating a sender public-private key pair for the sender with the sender;
  receiving a communication encrypted by the sender using a sender private key selected from said sender public-private key pair;
  recalling a sender public key selected from said sender public-private key pair from said sender registration record;
  authenticating the sender by using the recalled sender public key to decrypt the communication sent from the sender;
  establishing a first secure connection between the sender and the OC in response to authenticating the sender;
  associating the recipient with a recipient public key from a recipient public-private key pair, wherein said recipient public-private key pair is distinct and separate from said sender public-private key;

storing an escrow encryption key separate from said recipient public key and from said sender public key for selectively encrypting communications to the recipient in place of the recipient escrow encryption key; and encrypting a delivery to the recipient using the recipient public key if said recipient public key is stored in the OC and encrypting the delivery to the recipient using the escrow encryption key when said recipient public key is not stored in the OC, and subsequently sending the encrypted delivery to the recipient after encryption of the delivery by one from a group comprising a recipient public key and an escrow encryption key, the delivery comprising at least the document.

2. The method of claim 1 further comprising the OC performing the steps of:

receiving at least a portion of the delivery from the sender via the first secure connection;

storing the at least a portion of the delivery;

using the recipient public key, in conjunction with the recipient using the recipient private key, to authenticate the recipient;

establishing a second secure connection between the recipient and the OC; and transmitting the at least a portion of the delivery to the recipient via the second secure connection.

3. The method of claim 2 further comprising, in response to the recipient receiving the at least a portion of the delivery, the OC performing one from a group of steps comprising:

notifying the sender to form a second secure connection to the recipient to transmit the remainder of the delivery; and notifying the recipient to form a second secure connection to the sender to transmit the remainder of the delivery.

4. The method of claim 3 further comprising the OC performing one from a group of steps comprising:

receiving a first acknowledgement from the sender that the remainder of the delivery was transmitted to the recipient; and receiving a second acknowledgement from the recipient that the remainder of the delivery was received by the recipient.

5. The method of claim 2 wherein each of the first and second secure connections comprises one from a group comprising a direct line, a virtual private network connection, and a Secure Socket Layer connection.

6. The method of claim 2 wherein at least one of the first and second secure connections comprises a virtual private network connection formed by using a VPN encryption key at a layer selected from a group comprising an application layer, a presentation layer, and a session layer of the Open Systems Interconnect reference model.

7. The method of claim 2 wherein at least one of the first and second secure connections comprises a virtual private network connection formed by using at least one key from a group comprising the sender public key, the recipient public key, an OC public key, and a session key.

8. The method of claim 3 wherein the second secure connection between the sender and the recipient comprises one from a group comprising a direct line, a virtual private network connection, and a Secure Socket Layer connection.

9. The method of claim 3 wherein the second secure connection between the sender and the recipient comprises a virtual private network connection formed by using a VPN encryption key at a layer selected from a group comprising an application layer, a presentation layer, and a session layer of the Open Systems Interconnect reference model.

10. The method of claim 3 wherein the second secure connection comprises a virtual private network connection formed by using at least one key from a group comprising the sender public key, the recipient public key, and a session key.

11. The method of claim 2 wherein the delivery further comprises at least one from the group comprising:

a message digest comprising one of a group of a hash of the document, a hash of the document encrypted with a document encryption key, a hash of the document encrypted with the encryption key, and a hash of the document encrypted with the sender private key from the sender public-private key pair; and a digital signature signed by the sender private key from the sender publicprivate key pair.

12. The method of claim 11 further comprising the OC performing the steps of:

storing at least one of the message digest and the digital signature; and time-stamping and recording an acknowledgement from the recipient that the at least a portion of the delivery was received.

13. The method of claim 2 further comprising the OC performing the step of:

providing a delivery notification to the recipient that the OC is storing the at least a portion of the delivery for the recipient.

14. The method of claim 2 further comprising the OC performing the step of providing a notification to the sender of an event selected from a group comprising:

a failure of the OC to transmit the at least a portion of the delivery to the recipient within a specified time period;

a failure of the OC to locate a valid public key for the recipient; transmission of the at least a portion of the delivery to the recipient;

receipt of an acknowledgment from the recipient that the at least a portion of the delivery was received;

receipt of an acknowledgment from the recipient that the delivery was received; receipt of an acknowledgement from the recipient that the document was successfully decrypted; and a failure of the OC to transmit the at least a portion of the delivery to the recipient because the recipient is unable to access the recipient private key.

15. The method of claim 1 further comprising the OC performing the steps of:

storing the sender public key and the recipient public key in a database; and providing the sender and the recipient access to the database.

16. The method of claim 15 further comprising the OC performing at least one of the steps of:

revoking the sender public key;

revoking the recipient public key; and authorizing the generation of a new public-private key pair for at least one of a group comprising the sender, the recipient, and a new user.

17. The method of claim 1 further comprising the OC facilitating a direct and secure connection between the sender and the recipient by the OC performing the steps of:

using the recipient public key, in conjunction with the recipient using the recipient private key, to authenticate the recipient;

receiving a request from the sender to transmit the delivery directly to the recipient; and providing one from a group comprising:
  a notice to the sender that the recipient is available to directly accept the delivery; and
  a notice to the recipient that the sender is available to transmit the delivery directly to the recipient.

18. The method of claim 17 further comprising, in response to the sender and the recipient establishing a direct and secure connection and the sender transmitting the delivery to the recipient via the direct and secure connection, the OC performing the steps of:
  receiving a sender acknowledgement from the sender that the delivery was transmitted to the recipient; and
  receiving a recipient acknowledgement from the recipient that the delivery was received by the recipient.

19. The method of claim 17 wherein the direct and secure connection is a virtual private network connection formed by using a VPN encryption key at a layer selected from a group comprising an application layer, a presentation layer, and a session layer of the Open Systems Interconnect reference model.

20. The method of claim 17 wherein the direct and secure connection comprises one from a group comprising a direct line, a virtual private network connection, and a Secure Socket Layer connection.

21. The method of claim 17 wherein the direct and secure connection is a virtual private network connection formed by using at least one key from a group comprising the sender public key, the recipient public key, and a session key.

22. The method of claim 17 wherein the delivery further comprises at least one from the group comprising:
  a message digest comprising one of a group of a hash of the document, a hash of the document encrypted with a document encryption key, a hash of the document encrypted with the encryption key, and a hash of the document encrypted with a private key of the sender; and
  a digital signature signed by the sender private key from the sender publicprivate key pair.

23. The method of claim 18 further comprising the OC performing the step of:
  time-stamping and recording the sender acknowledgement and the recipient acknowledgement.

24. A system for securely delivering a document from a sender to a recipient, the system comprising an operations center (OC) comprising:
  a key manager module for associating the sender with a first sender public key from a sender public-private key pair and for associating the recipient with a second recipient public key from a recipient public-private key pair, where said sender public key and said receiver public key are not the same key;
  a directory interface, coupled to the key manager module and to a public key database and an escrow key manager, for searching the public key database upon request from the sender for an encryption key and for returning one key, where said one key is said recipient public key when a recipient public key is stored in the public key database, and said one key is an escrow encryption key only when said recipient public key is not returned from the public key database;
  an authentication module, coupled to the key manager module, for using the sender public key, in conjunction with the sender using the sender private key, to authenticate the sender;
  a secure connection module, coupled to the authentication module, for establishing a first secure connection between the sender and the OC; and
  a messaging module, coupled to the secure connection module, for receiving a request from the sender for an encryption key to secure a delivery, the delivery comprising at least the document, and for transmitting to the sender one from a group comprising the recipient public key and the escrow encryption key, where said escrow encryption key is used only to encrypt documents to be sent to the recipient.

25. The system of claim 24 further comprising:
  the authentication module further adapted for using the recipient public key, in conjunction with the recipient using the recipient private key, to authenticate the recipient;
  the secure connection module further adapted for establishing a second secure connection between the recipient and the OC;
  the messaging module further adapted for receiving at least a portion of the delivery from the sender via the first secure connection and for transmitting the at least a portion of the delivery to the recipient via the second reliable connection; and
  a storage area, including a computer-readable medium, coupled to the messaging module, for storing the at least a portion of the delivery.

26. The system of claim 25 further comprising:
  the messaging module further adapted for performing, in response to the recipient receiving the at least a portion of the delivery, one from a group of steps comprising:
  notifying the sender to form a secure connection to the recipient to transmit the remainder of the delivery; and
  notifying the recipient to form a secure connection to the sender to transmit the remainder of the delivery.

27. The system of claim 26 further comprising:
  a tracking module, coupled to the messaging module, for receiving a first acknowledgement from the sender that the remainder of the delivery was transmitted to the recipient, and for receiving a second acknowledgement from the recipient that the remainder of the delivery was received by the recipient.

28. The system of claim 25 wherein each of the first and second secure connections comprises one from a group comprising a direct line, a virtual private network connection, and a Secure Socket Layer connection.

29. The system of claim 25 wherein at least one of the first and second secure connections comprises a virtual private network connection formed by using a VPN encryption key at a layer selected from a group comprising an application layer, a presentation layer, and a session layer of the Open Systems Interconnect reference model.

30. The system of claim 25 wherein at least one of the first and second secure connections comprises a virtual private network connection formed by using at least one key from a group comprising the sender public key, the recipient public key, an OC public key, and a session key.

31. The system of claim 26 wherein the secure connection comprises a virtual private network connection formed by using at least one key from a group comprising the sender public key, the recipient public key, and a session key.

32. The system of claim 25 wherein the delivery further comprises at least one from the group comprising:
  a message digest comprising one of a group of a hash of the document, a hash of the document encrypted with a document encryption key, a hash of the document encrypted with the encryption key, and a hash of the document encrypted with the sender private key from the sender public-private key pair; and a digital signature signed by the sender private key from the sender public-private key pair.

33. The system of claim 32 further comprising:
a tracking module for recording at least one from the group comprising the message digest and the digital signature, and for time-stamping and recording an acknowledgement from the recipient that the at least a portion of the delivery was received.

34. The system of claim 25 further comprising:
the messaging module further adapted for providing a delivery notification to the recipient that the OC is storing the at least a portion of the delivery for the recipient.

35. The system of claim 25 further comprising:
the messaging module further adapted for providing a notification to the sender of an event selected from a group comprising:
a failure of the OC to transmit the at least a portion of the delivery to the recipient within a specified time period;
a failure of the OC to locate a valid public key for the recipient;
transmission of the at least a portion of the delivery to the recipient;
receipt of an acknowledgment from the recipient that the at least a portion of the delivery was received;
receipt of an acknowledgment from the recipient that the delivery was received; receipt of an acknowledgement from the recipient that the document was successfully decrypted; and a failure of the OC to transmit the at least a portion of the delivery to the recipient because the recipient is unable to access the recipient private key.

36. The system of claim 24 further comprising:
the key manager module further adapted for providing the sender and the recipient access to the public key database.

37. The system of claim 24 further comprising:
the key manager module further adapted for performing at least one of the steps of:
revoking the sender public key; revoking the recipient public key; and
authorizing the generation of a new public-private key pair for at least one of a group comprising the sender, the recipient, and a new user.

38. The system of claim 24 further adapted to facilitate a direct and secure connection between the sender and the recipient, the system further comprising:
the authentication module further adapted for using the recipient public key, in conjunction with the recipient using the recipient private key, to authenticate the recipient;
the messaging module further adapted for receiving a request from the sender to transmit the delivery directly to the recipient, and for providing one from a group comprising:
a notice to the sender that the recipient is available to directly accept the delivery; and
a notice to the recipient that the sender is available to transmit the delivery directly to the recipient.

39. The system of claim 38 further comprising:
the messaging module further adapted for receiving, in response to the sender and the recipient establishing a direct and secure connection and the sender transmitting the delivery to the recipient via the direct and secure connection:

a sender acknowledgement from the sender that the delivery was transmitted to the recipient; and
a recipient acknowledgement from the recipient that the delivery was received by the recipient.

40. The system of claim 38 wherein the direct and secure connection comprises a virtual private network connection formed by using a VPN encryption key at a layer from a group comprising an application layer, a presentation layer, and a session layer of the Open Systems Interconnect reference model.

41. The system of claim 38 wherein the direct and secure connection comprises one from a group comprising a direct line, a virtual private network connection, and a Secure Socket Layer connection.

42. The system of claim 38 wherein the direct and secure connection comprises a virtual private network connection formed by using at least one key from a group comprising the sender public key, the recipient public key, and a session key.

43. The system of claim 38 wherein the delivery further comprises at least one from the group comprising:
a message digest comprising one of a group of a hash of the document, a hash of the document encrypted with a document encryption key, a hash of the document encrypted with the encryption key, and a hash of the document encrypted with a private key of the sender; and
a digital signature signed by the sender private key from the sender public-private key pair.

44. The system of claim 39 further comprising:
a tracking module for time-stamping and recording the sender acknowledgement and the recipient acknowledgement.

45. In a computer-readable medium, a computer program product for an operations center (OC) facilitating secure delivery of a document from a sender to a recipient, the computer readable medium comprising program code adapted to perform the steps of:
associating the sender with a sender public key from a sender public-private key pair; using the sender public key, in conjunction with the sender using the sender private key, to authenticate the sender;
establishing a first secure connection between the sender and the OC;
associating the recipient with a recipient public key from a recipient publicprivate key pair; and
providing one from a group comprising a recipient public key and an escrow encryption key to the sender to secure a delivery, the delivery comprising at least the document.

46. The computer readable medium of claim 45 further comprising program code adapted to perform the steps of:
receiving at least a portion of the delivery from the sender via the first secure connection; storing the at least a portion of the delivery;
using the recipient public key, in conjunction with the recipient using the recipient private key, to authenticate the recipient;
establishing a second secure connection between the recipient and the OC; and transmitting the at least a portion of the delivery to the recipient via the second reliable connection.

47. The computer readable medium of claim 46 further comprising program code adapted to perform, in response to the recipient receiving the at least a portion of the delivery, one from a group of steps comprising:
  notifying the sender to form a secure connection to the recipient to transmit the remainder of the delivery; and
  notifying the recipient to form a secure connection to the sender to transmit the remainder of the delivery.

48. The computer readable medium of claim 47 further comprising program code adapted to perform one from a group of steps comprising:
  receiving a first acknowledgement from the sender that the remainder of the delivery was transmitted to the recipient; and
  receiving a second acknowledgement from the recipient that the remainder of the delivery was received by the recipient.

49. The computer readable medium of claim 46 wherein each of the first and second secure connections comprises one from a group comprising a direct line, a virtual private network connection, and a Secure Socket Layer connection.

50. The computer readable medium of claim 46 wherein at least one of the first and second secure connections comprises a virtual private network connection formed by using a VPN encryption key at a layer selected from a group comprising an application layer, a presentation layer, and a session layer of the Open Systems Interconnect reference model.

51. The computer readable medium of claim 46 wherein at least one of the first and second connections comprises a virtual private network connection formed by using at least one key from a group comprising the sender public key, the recipient public key, an OC public key, and a session key.

52. The computer readable medium of claim 47 wherein the secure connection between the sender and the recipient comprises one from a group comprising a direct line, a virtual private network connection, and a Secure Socket Layer connection.

53. The computer readable medium of claim 47 wherein the secure connection between the sender and the recipient comprises a virtual private network connection formed by using a VPN encryption key at a layer selected from a group comprising an application layer, a presentation layer, and a session layer of the Open Systems Interconnect reference model.

54. The computer readable medium of claim 47 wherein the secure connection comprises a virtual private network connection formed by using at least one key from a group comprising the sender public key, the recipient public key, and a session key.

55. The computer readable medium of claim 46 wherein the delivery further comprises at least one from the group comprising:
  a message digest comprising one of a group of a hash of the document, a hash of the document encrypted with a document encryption key, a hash of the document encrypted with the encryption key, and a hash of the document encrypted with the sender private key from the sender public-private key pair; and
  a digital signature signed by the sender private key from the sender publicprivate key pair.

56. The computer readable medium of claim 55 further comprising program code adapted to perform the steps of:
  storing at least one of the message digest and the digital signature; and time-stamping and recording an acknowledgement from the recipient that the at least a portion of the delivery was received.

57. The computer readable medium of claim 46 further comprising program code adapted to perform the step of:
  providing a delivery notification to the recipient that the OC is storing the at least a portion of the delivery for the recipient.

58. The computer readable medium of claim 46 further comprising program code adapted to perform the step of providing a notification to the sender of an event selected from a group comprising:
  a failure of the OC to transmit the at least a portion of the delivery to the recipient within a specified time period;
  a failure of the OC to locate a valid public key for the recipient; transmission of the at least a portion of the delivery to the recipient;
  receipt of an acknowledgment from the recipient that the at least a portion of the delivery was received;
  receipt of an acknowledgment from the recipient that the delivery was received; receipt of an acknowledgement from the recipient that the document was successfully decrypted; and
  a failure of the OC to transmit the at least a portion of the delivery to the recipient because the recipient is unable to access the recipient private key.

59. The computer readable medium of claim 45 further comprising program code adapted to perform the steps of:
  storing the sender public key and the recipient public key in a database; and providing the sender and the recipient access to the database.

60. The computer readable medium of claim 59 further comprising program code adapted to perform at least one of the steps of:
  revoking the sender public key; revoking the recipient public key; and
  authorizing the generation of a new public-private key pair for at least one of a group comprising the sender, the recipient, and a new user.

61. The computer readable medium of claim 45 further comprising program code adapted to facilitate a direct and secure connection between the sender and the recipient by performing the steps of:
  using the recipient public key, in conjunction with the recipient using the recipient private key, to authenticate the recipient;
  receiving a request from the sender to transmit the deliver directly to the recipient; and
  providing one from a group comprising:
    a notice to the sender that the recipient is available to directly accept the delivery; and
    a notice to the recipient that the sender is available to transmit the delivery directly to the recipient.

62. The computer readable medium of claim 61 further comprising program code adapted to perform the steps of:
  in response to the sender and the recipient establishing a direct and secure connection and the sender transmitting the delivery to the recipient via the direct and secure connection:
  receiving a sender acknowledgement from the sender that the delivery was transmitted to the recipient; and
  receiving a recipient acknowledgement from the recipient that the delivery was received by the recipient.

63. The computer readable medium of claim 61 wherein the direct and secure connection
  comprises a virtual private network connection formed by using a VPN encryption key at a layer selected from a group comprising an application layer, a presentation layer, and a session layer of the Open Systems Interconnect reference model.

64. The computer readable medium of claim 61 wherein the direct and secure connection comprises one from a group comprising a direct line, a virtual private network connection, and a Secure Socket Layer connection.

65. The computer readable medium of claim 64 wherein the direct and secure connection
comprises a virtual private network connection formed by using at least one key from a group comprising the sender public key, the recipient public key, and a session key.

66. The computer readable medium of claim 61 wherein the delivery further comprises at least one from the group comprising:
a message digest comprising one of a group or a hash of the document, a hash of the document encrypted with a document encryption key, a hash of the document encrypted with the encryption key, and a hash of the document encrypted with a private key of the sender; and
a digital signature signed by the sender private key from the sender public-private key pair.

67. The computer readable medium of claim 62 further comprising program code adapted to perform the step of:
time-stamping and recording the sender acknowledgement and the recipient acknowledgement.

* * * * *